United States Patent
Lee et al.

(10) Patent No.: US 11,941,916 B2
(45) Date of Patent: *Mar. 26, 2024

(54) PRACTICE DRILL-RELATED FEATURES USING QUANTITATIVE, BIOMECHANICAL-BASED ANALYSIS

(71) Applicant: Sportsbox.ai Inc., Bellevue, WA (US)

(72) Inventors: Jeehae Lee, San Francisco, CA (US); Samuel Menaker, Bellevue, WA (US); Michael Rye Kennewick, Sr., Bellevue, WA (US)

(73) Assignee: Sportsbox.ai Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,839

(22) Filed: Mar. 24, 2023

(65) Prior Publication Data
US 2023/0230418 A1   Jul. 20, 2023

Related U.S. Application Data

(63) Continuation of application No. 17/721,314, filed on Apr. 14, 2022, now Pat. No. 11,615,648.
(Continued)

(51) Int. Cl.
*G06V 40/20* (2022.01)
*A63B 24/00* (2006.01)
(Continued)

(52) U.S. Cl.
CPC .......... *G06V 40/23* (2022.01); *A63B 24/0006* (2013.01); *A63B 24/0062* (2013.01);
(Continued)

(58) Field of Classification Search
CPC ............ A63B 24/0006; A63B 24/0062; A63B 24/0087; A63B 71/0622;
(Continued)

(56) References Cited

U.S. PATENT DOCUMENTS

| 4,375,887 A | 3/1983 | Lynch |
| 5,148,477 A | 9/1992 | Neely |

(Continued)

FOREIGN PATENT DOCUMENTS

| CN | 104298353 | 1/2015 |
| EP | 2843621 | 3/2015 |

OTHER PUBLICATIONS

"Xsens Extends Industrial Motion Tracking Products with New Rugged Modules for harsh Environments", retrieved from the Internet at <URL: https://www.xsens.com/press-releases/xsens-extends-industrial-motion-tracking-products-with-new-rugged-modules-for-harsh-environments>, May 20, 2021 (Year: 2021), retrieved from the Internet on Nov. 8, 2022, 3 pages.

(Continued)

*Primary Examiner* — Joshua Lee
(74) *Attorney, Agent, or Firm* — Sheppard Mullin Richter & Hampton LLP

(57) ABSTRACT

Systems and methods are disclosed for generating and providing guided practices and coaching feedback (e.g., illustrated in 3D images, video, or audio) that allow golfers to follow along to improve their physical swing in a digital environment. The feedback may be provided with a 3D avatar using a biomechanical analysis of observed actions with a focus on representing actions through computer-generated 3D avatars. Physical quantities of biomechanical actions can be measured from the observations, and the system can analyze these values, compare them to target or optimal values, and use the observations and known biomechanical capabilities to generate the guided practices and coaching feedback.

44 Claims, 25 Drawing Sheets

Related U.S. Application Data

(60) Provisional application No. 63/194,308, filed on May 28, 2021.

(51) Int. Cl.
  *A63B 69/36* (2006.01)
  *A63B 71/06* (2006.01)
  *G06T 13/40* (2011.01)
  *G06V 10/34* (2022.01)

(52) U.S. Cl.
  CPC ...... *A63B 24/0087* (2013.01); *A63B 69/3605* (2020.08); *A63B 71/0622* (2013.01); *G06T 13/40* (2013.01); *G06V 10/34* (2022.01); *A63B 2024/0009* (2013.01); *A63B 2024/0015* (2013.01); *A63B 2024/0096* (2013.01); *A63B 69/36* (2013.01); *A63B 2071/063* (2013.01); *A63B 2071/0636* (2013.01); *A63B 2071/0647* (2013.01); *A63B 2220/05* (2013.01); *A63B 2220/806* (2013.01)

(58) Field of Classification Search
  CPC .... A63B 2024/0009; A63B 2024/0015; A63B 2024/0096; A63B 2071/063; A63B 2071/0636; A63B 2071/0647; A63B 2220/806; G06V 40/23
  See application file for complete search history.

(56) References Cited

U.S. PATENT DOCUMENTS

| | | |
|---|---|---|
| 5,249,967 A | 10/1993 | O'Leary |
| 5,772,522 A | 6/1998 | Nesbit |
| D400,196 S | 10/1998 | Cameron, Sr. |
| 6,083,123 A | 7/2000 | Wood |
| D467,251 S | 12/2002 | Platz |
| D467,253 S | 12/2002 | Platz |
| 7,041,014 B2 | 5/2006 | Wright |
| 7,200,266 B2 | 4/2007 | Ozer |
| 7,317,836 B2 | 1/2008 | Fujimura |
| 7,847,808 B2 | 12/2010 | Cheng |
| 7,887,440 B2 | 2/2011 | Wright |
| 7,967,695 B2 | 6/2011 | Voges |
| 8,189,866 B1 | 5/2012 | Gu |
| 8,506,425 B2 | 8/2013 | Wright |
| RE44,862 E | 4/2014 | Wright |
| 8,696,497 B2 | 4/2014 | Voges |
| 8,950,236 B2 | 2/2015 | Ishii |
| 8,979,665 B1 | 3/2015 | Najafi |
| 9,161,708 B2 | 10/2015 | Elliott |
| 9,211,439 B1 | 12/2015 | Pedenko |
| 9,248,361 B1* | 2/2016 | Jones ................ G06Q 10/0639 |
| D752,646 S | 3/2016 | Miles |
| 9,358,456 B1 | 6/2016 | Challinor |
| 9,480,883 B2 | 11/2016 | Ishii |
| 9,589,207 B2 | 3/2017 | Holohan |
| 9,600,717 B1 | 3/2017 | Dai |
| D785,656 S | 5/2017 | Bramer |
| 9,656,121 B2 | 5/2017 | Rose |
| 9,830,951 B2 | 11/2017 | Bose |
| D807,400 S | 1/2018 | Lagreca |
| D807,918 S | 1/2018 | Cohen |
| 9,878,206 B2 | 1/2018 | Rowe |
| 9,898,675 B2 | 2/2018 | Yee |
| 9,978,425 B2 | 5/2018 | Kirk |
| 10,008,126 B1 | 6/2018 | Linderman |
| 10,010,753 B2 | 7/2018 | Brothers |
| 10,076,698 B2 | 9/2018 | Spivak |
| 10,080,941 B2 | 9/2018 | Brekke |
| D835,145 S | 12/2018 | Cashner |
| D836,123 S | 12/2018 | Pillalamarri |
| 10,186,041 B2 | 1/2019 | Chang |
| 10,188,324 B2 | 1/2019 | Matsunaga |
| 10,213,645 B1 | 2/2019 | Wu |
| 10,271,773 B2 | 4/2019 | Chang |
| 10,339,978 B2 | 7/2019 | Bose |
| 10,410,359 B2 | 9/2019 | Marks |
| 10,478,689 B2 | 11/2019 | Brekke |
| 10,748,581 B2 | 8/2020 | Bose |
| 10,755,466 B2 | 8/2020 | Chamdani |
| 10,799,781 B1 | 10/2020 | Means |
| 10,828,549 B2* | 11/2020 | Li ........................ G06V 20/40 |
| 10,885,691 B1 | 1/2021 | Parker |
| D917,564 S | 4/2021 | Indorf |
| D918,932 S | 5/2021 | Gkanatsios |
| D922,423 S | 6/2021 | Frueh |
| D922,424 S | 6/2021 | Frueh |
| 11,040,260 B1 | 6/2021 | Isgar |
| D928,189 S | 8/2021 | Giannino |
| D936,678 S | 11/2021 | Frueh |
| 11,276,196 B2 | 3/2022 | Bickerstaff |
| D953,348 S | 5/2022 | Barnes |
| 11,348,255 B2 | 5/2022 | Tamir |
| D954,108 S | 6/2022 | Kawano |
| 11,355,160 B2 | 6/2022 | Bose |
| 11,373,354 B2 | 6/2022 | Tamir |
| 11,426,099 B2* | 8/2022 | Barr ...................... G06V 20/20 |
| 11,450,053 B1 | 9/2022 | Georgis |
| D975,721 S | 1/2023 | Arima |
| D982,032 S | 3/2023 | Putnam |
| 11,645,873 B1 | 5/2023 | Lui |
| 11,716,629 B2 | 8/2023 | Devine |
| D999,244 S | 9/2023 | Indorf |
| D999,245 S | 9/2023 | Indorf |
| 2001/0029207 A1 | 10/2001 | Cameron |
| 2002/0001449 A1 | 1/2002 | Sato |
| 2002/0114493 A1 | 8/2002 | McNitt |
| 2003/0008731 A1 | 1/2003 | Anderson |
| 2003/0054327 A1 | 3/2003 | Evensen |
| 2004/0131254 A1 | 7/2004 | Liang |
| 2004/0162154 A1 | 8/2004 | DeJohn |
| 2005/0261073 A1 | 11/2005 | Farrington |
| 2006/0059426 A1 | 3/2006 | Ogikubo |
| 2007/0135225 A1 | 6/2007 | Nieminen |
| 2008/0144964 A1 | 6/2008 | Soinio |
| 2008/0318682 A1 | 12/2008 | Rofougaran |
| 2009/0002316 A1 | 1/2009 | Rofougaran |
| 2009/0094555 A1 | 4/2009 | Tomi |
| 2009/0111602 A1 | 4/2009 | Savarese |
| 2010/0081116 A1 | 4/2010 | Barasch |
| 2010/0121227 A1* | 5/2010 | Stirling ................ A61B 5/6802 600/595 |
| 2010/0302257 A1 | 12/2010 | Perez |
| 2010/0303303 A1 | 12/2010 | Shen |
| 2011/0054870 A1 | 3/2011 | Dariush |
| 2011/0182469 A1 | 7/2011 | Ji |
| 2011/0276153 A1 | 11/2011 | Selner |
| 2011/0306398 A1 | 12/2011 | Boch |
| 2012/0052971 A1 | 3/2012 | Bentley |
| 2012/0070070 A1 | 3/2012 | Litvak |
| 2012/0116548 A1 | 5/2012 | Goree |
| 2012/0149483 A1 | 6/2012 | Donahue |
| 2012/0236027 A1 | 9/2012 | Ogata |
| 2013/0089845 A1 | 4/2013 | Hutchison |
| 2014/0079290 A1 | 3/2014 | Nakano |
| 2014/0143183 A1 | 5/2014 | Sigal |
| 2014/0193132 A1 | 7/2014 | Lee |
| 2014/0200094 A1 | 7/2014 | Parke |
| 2014/0257538 A1 | 9/2014 | Rose |
| 2014/0337177 A1 | 11/2014 | Pitts |
| 2015/0363644 A1 | 12/2015 | Wnuk |
| 2016/0049089 A1 | 2/2016 | Witt |
| 2016/0059103 A1 | 3/2016 | Han |
| 2016/0148054 A1 | 5/2016 | Han |
| 2016/0256740 A1 | 9/2016 | Rowe |
| 2016/0370854 A1 | 12/2016 | Steele |
| 2017/0001072 A1 | 1/2017 | Brekke |
| 2017/0043228 A1 | 2/2017 | Hunter |
| 2017/0228587 A1 | 8/2017 | Zhang |
| 2017/0274256 A1 | 9/2017 | Brekke |
| 2017/0316578 A1 | 11/2017 | Fua |
| 2017/0354859 A1 | 12/2017 | Okazaki |
| 2017/0365085 A1 | 12/2017 | Moll |

(56) References Cited

U.S. PATENT DOCUMENTS

| | | |
|---|---|---|
| 2018/0050255 A1 | 2/2018 | Maani |
| 2018/0256962 A1 | 9/2018 | Kudirka |
| 2018/0357472 A1 | 12/2018 | Dreessen |
| 2018/0360383 A1 | 12/2018 | Ishikura |
| 2018/0369678 A1 | 12/2018 | Yang |
| 2019/0043240 A1 | 2/2019 | Finegold |
| 2019/0046836 A1 | 2/2019 | Starkey |
| 2019/0114690 A1 | 4/2019 | Paquette |
| 2019/0130602 A1 | 5/2019 | Hall |
| 2019/0224528 A1* | 7/2019 | Omid-Zohoor ...... A61B 5/6806 |
| 2019/0347826 A1 | 11/2019 | Zhang |
| 2019/0362506 A1 | 11/2019 | Leroyer |
| 2020/0005544 A1 | 1/2020 | Kim |
| 2020/0005670 A1 | 1/2020 | Iwao |
| 2020/0047029 A1 | 2/2020 | Bentley |
| 2020/0058137 A1 | 2/2020 | Pujades |
| 2020/0222757 A1 | 7/2020 | Yang |
| 2020/0273229 A1* | 8/2020 | Thielen ................. G06T 19/006 |
| 2020/0312037 A1 | 10/2020 | Kopeinigg |
| 2020/0396411 A1 | 12/2020 | Hattori |
| 2020/0398110 A1 | 12/2020 | Kosowsky |
| 2021/0004981 A1 | 1/2021 | Song |
| 2021/0089761 A1 | 3/2021 | Tyomkin |
| 2021/0097768 A1 | 4/2021 | Malia |
| 2021/0117661 A1 | 4/2021 | Iqbal |
| 2021/0255826 A1 | 8/2021 | Devine |
| 2021/0311546 A1 | 10/2021 | Kodama |
| 2021/0385417 A1 | 12/2021 | Park |
| 2022/0023730 A1 | 1/2022 | Howenstein |
| 2022/0036052 A1* | 2/2022 | Prince ................. A63B 24/0006 |
| 2022/0111275 A1 | 4/2022 | Bryson |
| 2022/0241642 A1* | 8/2022 | Halevy ................ A61B 5/1122 |
| 2022/0245836 A1* | 8/2022 | Halevy ................ G06T 19/006 |
| 2022/0266091 A1 | 8/2022 | Yuen |
| 2023/0017367 A1 | 1/2023 | May |

OTHER PUBLICATIONS

Ke, Shian-Ru, et al., "A Review on Video-Based Human Activity Recognition", Computers, vol. 2, doi: 10.3390/computers2020088, 2013, pp. 88-131.

Lemire, Joe, "Track160's New App Lets Players Share Video and Advanced Analysis, Creating New Fan Engagement Opportunities", SportTechie | Sports Business Journal, Jul. 27, 2022, 5 pages.

Wei et al., "Intuitive Interactive Human-Character Posing with Millions of Example Poses", IEEE Computer Society, Jul./Aug. 2011 (Year: 2011), pp. 78-88.

Barcenas, Tere, "Rare Golf Mobile App MVP design", Tere Barcenas—UX Designer, published Feb. 2021, Retrieved from the Internet Oct. 31, 2023 at <URL: https://www.terebarcenas.com/projects/rare-golf> (Year: 2021), 5 pages.

Kennedy, Jamie, "SkyPro Swing Analyser Review", Golfalot, published Sep. 4, 2013, Retrieved from the Internet Oct. 31, 2023, at <URL: https://www.golfalot.com/equipment-reviews/skypro-swing-analyser-review-2555.aspx> (Year: 2013), 2 pages.

* cited by examiner

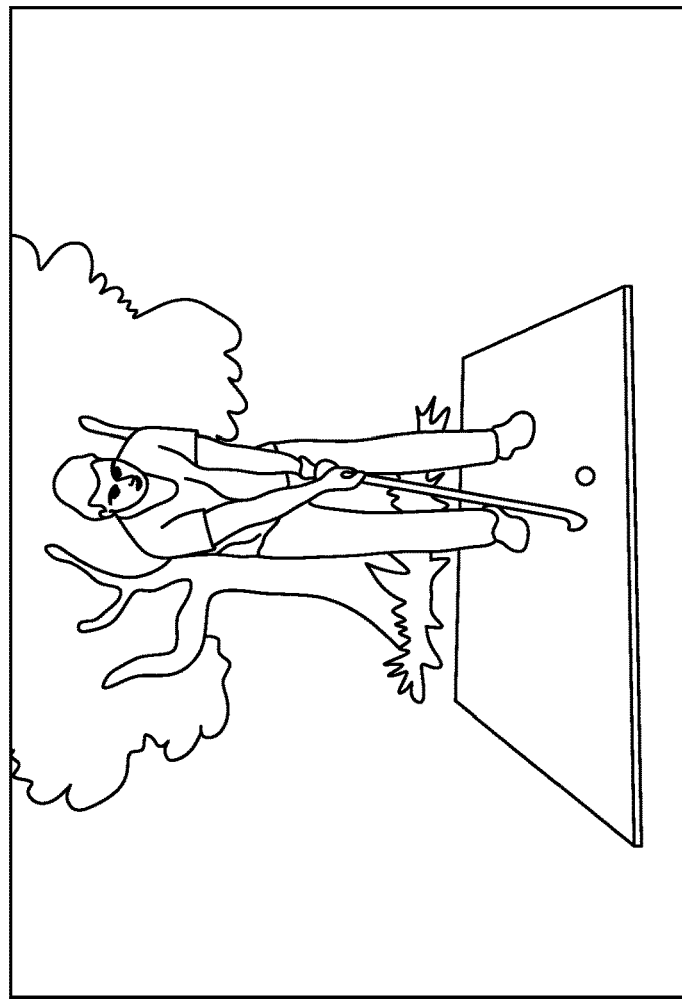
FIG. 5

Watchlist

|   | Name | Type | Required | Descriptions |
|---|------|------|----------|--------------|
| 1 | uid | String |  | Autogenerated ID from firebase |
| 2 | userId | String | Yes | Reference to user ID to associate user details |
| 3 | score | String |  | What it your target score you want to achieve |
| 4 | date | Date | Yes | Date when you inserted your tracker into watchlist. |
| 5 | POV | String | Yes | Avatar position |
| 6 | zoom | Int |  | Zoom Level |
| 7 | trackers | String | Yes | Lists of tracker for watchlist item. (Valid Json String) |

FIG. 12

Tracker ::Under-Review

Global to application feature supported, we can add more trackers to support more feature and user can use them in their watchlist item.

| | Name | Type | Required | Descriptions |
|---|---|---|---|---|
| 1 | uid | String | | Autogenerated ID from firebase |
| 2 | name | String | Yes | Tracker name |
| 3 | category | Constant | Yes | Category name (constant) for tracker |
| 4 | descriptions | String | Yes | short description to define tracker |
| 5 | trackerType | String | Yes | Static or Dynamic ways of tracking. |
| 6 | measureUnit | String | Yes | What format do you measure each trackers. Like: degrees, inches, ... |

FIG. 13

Watchlist-Tracker

| name | type | required |
|---|---|---|
| uid | String | Yes |
| watchlistId | | |
| trackerId | | |
| min | | |
| max | | |
| position | | |

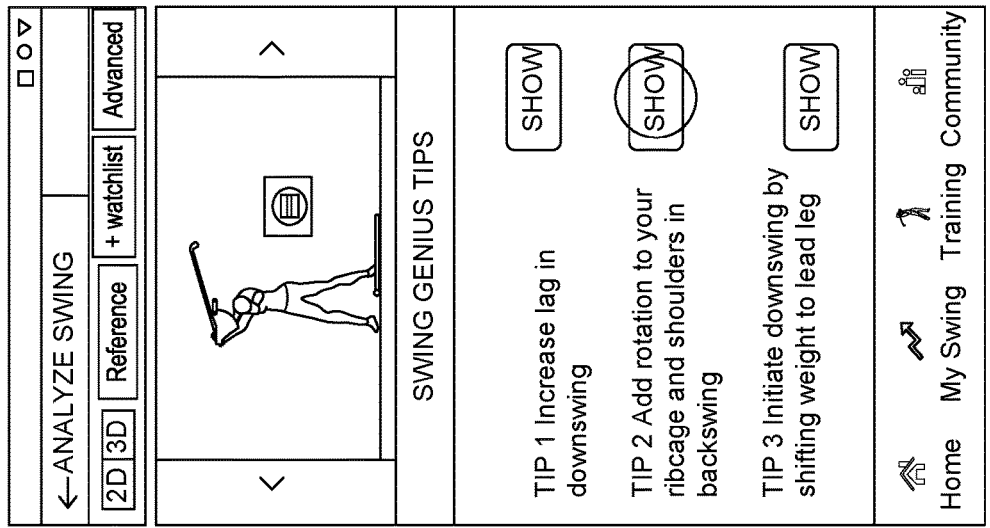

- Reference Model (allows user to change reference swing)
- Move "Speed" to swing slider Actions available:
- Play the swing in various speeds and jump to preset swing positions
- Expand either avatar into full screen view (to show only one avatar on screen) and return to show both
- Change POV
  - by tapping on 'FO' (both avatars are synced by default in this action)
  - by swiping the avatar (two avatars not synced)
- Add to Watch list (or 'Keep Track')
- See more for more explanation and content on how to address each problem
- Swipe up to see all the lesson tips

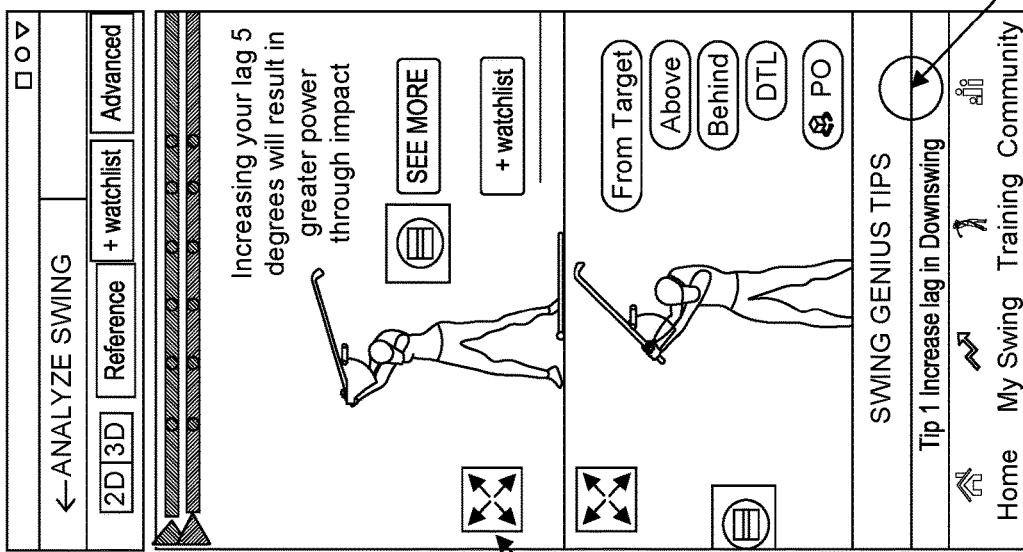

Expands to have one avatar take full screen

Swipe up for more lesson notes

FIG. 20

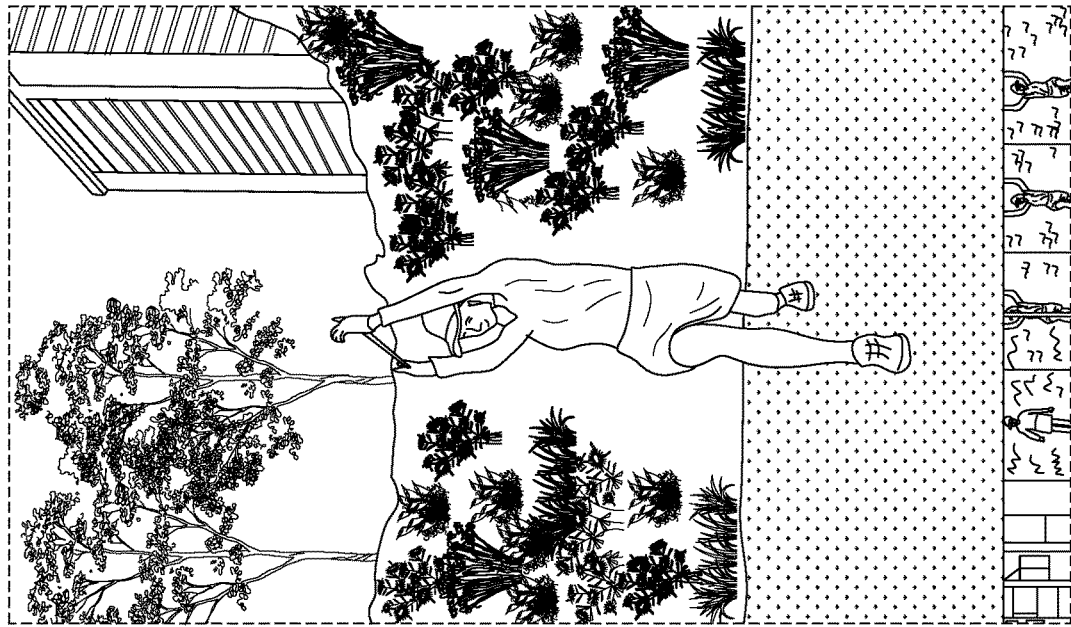
FIG. 22

PRACTICE DRILL-RELATED FEATURES USING QUANTITATIVE, BIOMECHANICAL-BASED ANALYSIS

REFERENCE TO RELATED APPLICATIONS

This application is a continuation of U.S. patent application Ser. No. 17/721,314, filed Apr. 14, 2022, which claims the benefit under 35 U.S.C. § 119(e) of U.S. Patent Application No. 63/194,308, filed May 28, 2021, which is hereby incorporated by reference in its entirety. This application is co-pending with U.S. patent application Ser. Nos. 17/721,305 and 17/721,318, the contents of each of these applications are incorporated by reference in their entirety for all purposes.

TECHNICAL FIELD

The disclosed technology relates generally to biomechanical analysis of observed actions, with a focus on representing actions through computer-generated three-dimensional (3D) avatars. Particularly, physical quantities of biomechanical actions can be measured from the observations, and the system can analyze these values, compare them to target or optimal values, and use the observations and known biomechanical capabilities to generate 3D avatars.

BACKGROUND

Golfers have a difficult time identifying how to improve their swing. There are many books and coaches offering assistance, but with the variability of a golfer swing, it is difficult to pinpoint exactly what used to change in order to improve their swing. Also, unless somebody is watching the golfer in real time, the golfer rarely provides a consistent swing that can be analyzed in relation to the feedback provided in the books and from coaches. Additionally, it is often difficult to understand the factors that can lead to swing improvement.

BRIEF SUMMARY OF EMBODIMENTS

Systems, methods, and computer readable media are disclosed for applying biomechanical analysis of observed actions, with a focus on representing actions through computer-generated three-dimensional (3D) avatars. Physical quantities of biomechanical actions can be measured from the observations, and the system can analyze these values, compare them to target or optimal values, and use the observations and known biomechanical capabilities to generate 3D avatars. The system can take measurements of quantifiable aspects of an actor's performance. Those measurements can be used in the biomechanical analysis of the performance and generation of 3D avatars to visualize the performance, different aspects of it, or modified versions of it.

The system may use watch lists and motion trackers. A watch list is a list of measurable attributes of the performance that the system is monitoring (that is, measuring throughout the performance of the action), while a motion tracker is the sequence of measurements—the actual values—taken throughout the performance. As detailed herein, the watch lists and motion trackers can be domain specific. The system may enable the creation of one or more motion trackers comprising specific kinematic parameters and/or sequences of motion. The kinematic parameters may comprise position, velocity, acceleration, and/or higher-order derivatives of the position with respect to time. The behavior of higher order derivatives may be implicated in the real or perceived smoothness of motions. For example, the third order derivative (e.g., the derivative after acceleration) may correspond with "jerk" and can amount to smoothing out changes in acceleration. The fourth order derivative may correspond with "snap." In some examples, higher order derivatives may be recognized by the system. The system may determine and/or incorporate various orders of derivatives that may be incorporated with a given domain.

Using these data and analytics, the technology described herein can provide guided practices and coaching feedback (e.g., illustrated in 3D images, video, or audio) that allow golfers to follow along to improve their physical swing in a digital environment. The guided practices may begin with a demonstration of the exercises, drills, or audio guidance to be watched/listened to during a user's practice session. The guided practice can provide an accurate demonstration of a motion or action of the drill and voice navigation describing what is required to correctly perform the drill. The length of the practice session may be customizable.

The content of the guided practices may be determined based on an individual user. For example, the system may receive images of the user's practice or actual swings. The system may determine portions of the swing that may be adjusted to improve on distance or accuracy of the resulting ball placement, based at least in part on tracking biomechanical movements of the user (e.g., using kinematic parameters, described herein). The guided practices may be tailored with drills and exercises that are specifically designed and targeted to the portions of the swing that may be adjusted and/or specific portions of the swing that the user personally identifies (e.g., in a feedback loop via the interface).

Another aspect of the invention relates to developing a biomechanical understanding of an actor using a neural network. This may be used, for example, to measure human movement such as bending at the waist (forward and back), lifting (up and down movement) and sway (side to side movement). From this the system can automatically generate 3D avatars of the actor from a single-viewpoint recording and detect multiple joints through 3D pose estimation, or the conversion of a 2D pose estimation into a 3D space. The system can connect those joints to assess kinematic parameters and sequences (e.g., via motion trackers) relative to a specific domain such as sports performance, physical therapy, assessing well-being and/or other domains. For example, to determine the posture of an individual, the kinematic parameters of the joints connected to the torso may be measured and temporally tracked according to short-term degree of bend, lift and thrust across frames as well as the kinematic sequence that is observed and then statistically compared to a database to determine likely meanings of the movement. Kinematic parameters may correspond with measurable attributes of a performance, sometimes limited to a particular context. In some examples, a kinematic parameter is a quantity relating to an actor's performance of an action that is of interest to the biomechanical analysis and that can be derived from observations of the performance.

The images of the user's swings may be analyzed. In some examples, one or more portions of a user's body may be identified and tracked as a watchlist item. For example, various kinematic parameters (KPs) (e.g., body movements, golf club, golf ball, etc.) may be tracked to detect swing (e.g., hand speed at the impact, golf club position at the start/end of the swing, ball speed, or mid hands sway and lift, etc.).

The KPs may comprise first order and second order trackers that quantify movements of the athlete user. For example, first order trackers can correspond with a first measurement determined from a camera or sensor and the second order tracker may correspond with the derivative of the first order tracker. An illustrative example is a first order tracker being chest turn or chest sway and a second order tracker being speed and acceleration of the first order tracker). In other examples, the two trackers may be combined to determine cumulative measurements (e.g., x-factor, or the difference between chest and pelvis turns).

First order trackers may comprise, for example, turn (e.g., shoulder/chest turn, pelvis turn, spine turn or x-factor), side bend (e.g., shoulder/chest side bend, pelvis side bend, or spine side bend), bend (e.g., shoulder/chest bend, pelvis bend, or spine bend), flex (e.g., lead knee, trail knee, lead elbow, trail elbow, lead wrist, or trail wrist), other body angles (e.g., lead wrist, lead arm adduction, torso tilt, torso side tilt, lead hip, or trail hip), sway (e.g., pelvis sway, chest sway, lead knee sway, trail knee sway, head sway, or mid hands sway), lift (e.g., pelvis lift, chest lift, lead knee lift, trail knee lift, head lift, mid hands sway), or thrust (e.g., pelvis lift, chest lift, lead knee lift, trail knee lift, head lift, or mid hands sway).

Second order trackers may comprise, for example, a kinematic sequence (e.g., pelvis and chest turn speeds, lead arm and club shaft swing speeds, body segment linear speeds including sway speed, lift speed, or thrust speed), timing relationships, speed gains across joints, speed (e.g., hosel speed as a linear speed of the club head measured in miles per hour, mid hands speed, lead wrist release speed, timing, or tempo), swing size (e.g., swing width, swing length, or swing height), or club (e.g., shaft angle including face on and down the line, club head speed, club face angle, attack angle, swing direction, or club path).

Various techniques may be used to create and/or manage motion trackers and watch lists. In some embodiments, this may be done dynamically through a UI by clicking, tapping, or otherwise selecting an actor's components (e.g., body parts, clothing, spacing between limbs, etc.) or context objects (e.g., sports equipment, juggling objects, umpire, etc.) in order to select motion trackers that track the kinematic parameters (e.g., position, velocity, acceleration, etc.) of those components and context objects, individually or in groups. Such a tracker or group of trackers may comprise a watch list to assess a performance of an action. Watch lists enable tracking of, and analytics on, the kinematic parameters for the indicated components throughout the actor's performance of actions against an ideal or some other reference (e.g. viewing a trace of the line between a user's elbows, wrists, and the head of a golf club throughout a golf swing, etc.).

Various UI features may be provided to select one or more components for tracking, grouping selected components into a watch list for subsequent use or analysis, etc. Various UI features may be provided for automatically determining a set of components constituting a watch list, such as through comparison of a user's performance of an action to a recording of an example performance. In some examples, the set of components may be automatically determined through automated processes in the system and described throughout the disclosure. Various UI features may be provided for authoring a watch list through programming and editing tools, such that the watch list can be saved, loaded, built into or imported into applications, selected and activated by users, etc.

The system may use the watch list to record the kinematic parameters (e.g., positions, angles, velocities, etc.) of the components in the watch list during the performance of an action. It may use the recorded kinematic parameters (KPs) to drive analysis of the performance, present information to the user based on the results of watch list analysis, correlate the results of watch list analysis with additional context data to affect what information is presented to the user.

The system may incorporate additional sensor data at runtime to improve the accuracy or visual appearance of the avatar, or to incorporate additional kinematic parameters/sequences.

In some embodiments, the system may apply recorded 3D motion data from a user to an avatar. By way of example this may be used for playback of the user's own performances, enabling the user to watch their own performance (e.g., a golf swing) from any angle (e.g., so they can see what they are doing wrong). As another example, the system may apply one user's recorded KP sequence to another avatar, letting the user (e.g., a golf coach, whose swing is recorded) model performances for another user (the student, whose avatar is then animated using the coach's KP sequence). As another example, the system may apply recorded 3D motion data from a reference video to an avatar. This may enable deriving a KP sequence from video of a reference performance of an action (e.g. a specific pro golfer's tee shot on a 350 yard hole that breaks to the left). Alternatively, it may be used to enable applying a derived KP sequence to the user's avatar (e.g. to show the user how they should tee off on that hole).

As another example, the system may model performances by applying KP sequences or changes to ranges of motion of a user's avatar in conjunction with physical simulation techniques (physics engines). This may be done in connection with altering values in the KP sequence to simulate changes in performance of an action and the results of those changes (e.g. increasing the user's swing speed by 10% to simulate how far they could drive the ball) or altering range of motion limitations for an avatar to simulate reduced performance under injury or, in physical therapy scenarios, improvements to performance that could be expected with healing from injury.

As another example, the system may assess a user's change in performance over time. This may be used to gauge improvement vs. different training regimens or techniques, gauge performance loss (when to bench a player, either temporarily due to fatigue, semi-permanently due to injury, or permanently because they are unable to compete), compare measurements of motion trackers against experts or other users and ranking the user's performance against such experts or other users based on closest measurements of kinematic parameters and sequences against a target measurement or outcome (e.g. which MLB player really had the "sweetest swing" of all time?).

As another example, the system may model or simulate performances by applying KP sequences with different context objects (i.e. use simulation to show what the user could do, using the user's own motions, if they had different golf shoes, different clubs, a low-drag swimsuit, etc.). For example, a user is following a 30-min bootcamp fitness session, during which he is directed to perform five overhead squats. Each squat may be being measured using KPs for each body segment/joint on each side of the body. The disclosed system (e.g., using a trained machine learning model) can detect that the right hip range of motion is consistently lower than the left and immediately recommend a set of right hip mobility exercises after the current set. In other examples, the system may be implemented for sports without objects (e.g., running and swimming) or sports with objects (e.g., golfing, baseball, lacrosse, tennis, soccer, basketball, or weightlifting), or other activities like condition and recovery According to another aspect, the system may combine 3D avatar renderings with recorded video. This may be used, for example, for overlaying a time-synchronized 3D avatar rendering with a video recording of a user's performance, to allow the user to compare current performance with past performances (e.g., "show this swing versus my best swing"), overlaying a time-synchronized 3D avatar rendering with a video recording of a reference performance (e.g., "show my best swing versus a specific pro golfer"), and/or automatically detecting and highlighting differences between two performances.

According to another aspect, the system may blend KP sequence data from multiple sources to generate a fused avatar and/or KP sequence. In some cases, the system may combine multiple KP sequences from the same user to determine an average performance for that user (e.g., "Your typical tee shot looks like this"), combine KP sequences from multiple users to determine an average performance for some action in general, combine portions of KP sequences from selected users to create a hybrid (e.g., tee-shot that's Tiger Woods from the waist up, Jack Nicklaus from the waist down), blend KP sequence data from multiple sources to derive generalized insights relating to the factors affecting performance and/or combine or blend for other purposes.

According to another aspect, the system may provide guided practices that end with feedback for the user. For example, the feedback may include images or video of the user performing the guided practices. This may allow the user to analyze their swings in relation to one or more items that the user or system identified as portions of the swing to improve. In another example, the feedback may compare a user's desired outcome with the actual outcome (e.g., the swing from the guided practice) and visually identify the differences between the two. In yet another example, the feedback may comprise new portions of the swing that the user may adjust that have not been previously identified.

Tailoring of the guided practices and drills may be adjusted based on physical limitations of the user that can affect the swing (e.g., age or height of the user). For example, the potential guided practices that are provided as feedback for the user may be filtered/removed based on these physical limitations.

The guided practice may replicate the conditions and feelings of being on the golf course so that they can translate their golf swing from the range to the golf course. For example, the user device may measure environmental conditions (e.g., the windspeed during the practice swing) and show the data during the guided practice. Providing this information to the user may adjust the response from the athlete user to follow the practice guide.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 5 is an illustrative human movement, in accordance with the embodiments disclosed herein.

FIG. 12 illustrates a data store storing watch list data for a 3D avatar, in accordance with the embodiments disclosed herein.

FIG. 13 illustrates a data store storing tracker data for a 3D avatar, in accordance with the embodiments disclosed herein.

FIG. 14 illustrates a data store storing watch list and tracker data for determining 3D movements by the biomechanical analytics computer system, in accordance with the embodiments disclosed herein.

FIG. 15 illustrates a set of user interfaces that provide analysis of an athlete user's movement related to coaching feedback, in accordance with the embodiments disclosed herein.

FIG. 19 illustrates a set of user interfaces that show recording options and coaching feedback of an athlete user's movement, in accordance with the embodiments disclosed herein.

FIG. 20 illustrates a set of user interfaces that show coaching feedback of an athlete user's movement, in accordance with the embodiments disclosed herein.

FIG. 22 illustrates images of an athlete user's movement in response to coaching feedback from the system, in accordance with the embodiments disclosed herein.

Figure 1:
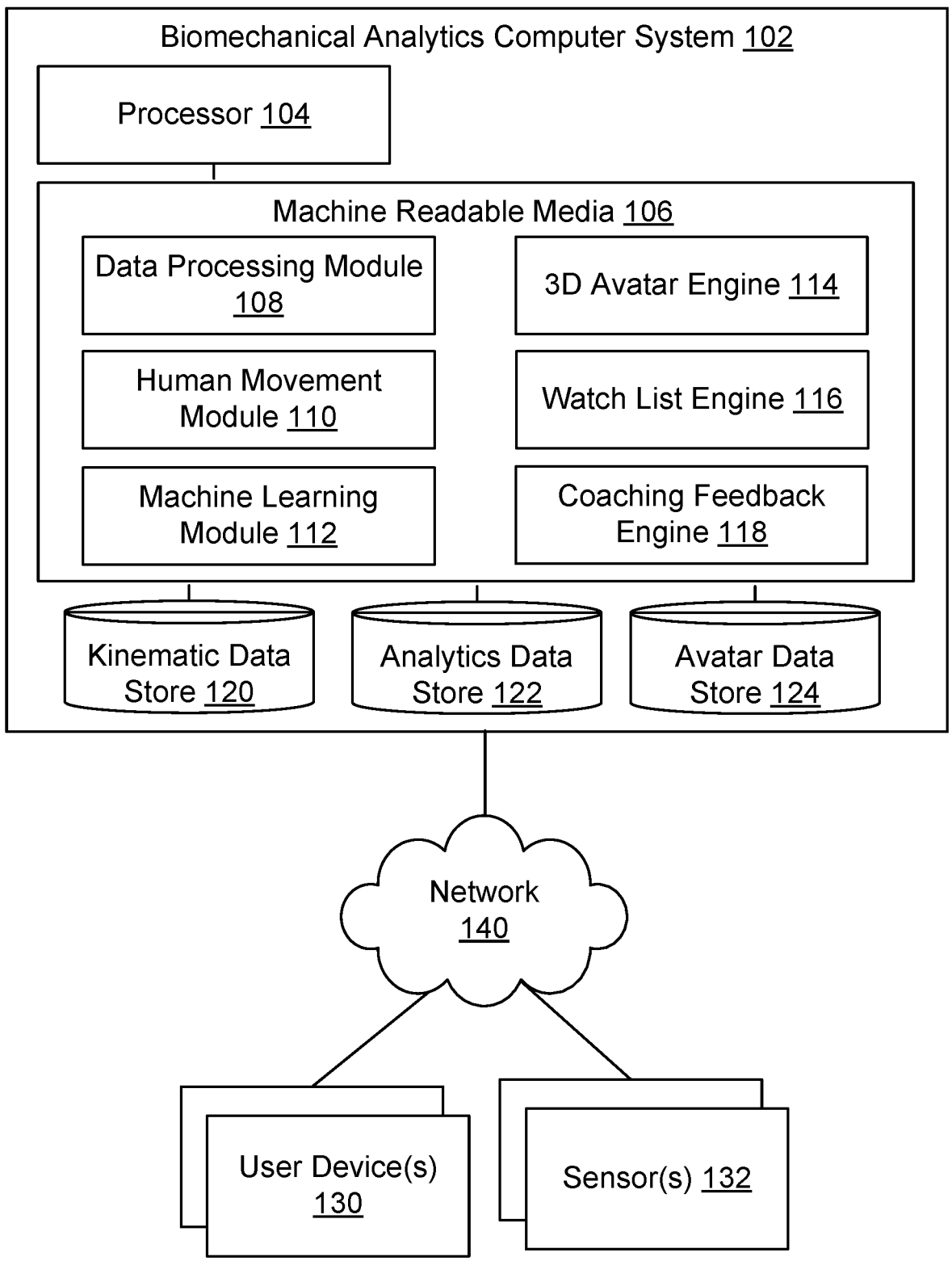
FIG. 1 illustrates a biomechanical analytics computer system, in accordance with the embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments disclosed herein describe systems and methods for performing biomechanical analysis of observed actions through 3D avatars and quantification of physical attributes of the actions for comparison to target or optimal values. The physical quantities associated with the actions can be measured from the recorded observations, analyzed, compared to target or optimal values (which may be previously stored) and used for other purposes. The analysis may include analyzing the actions observed by the system to take measurements of quantifiable aspects of the performance. As used herein, the term "performance" includes a single actor's production of an activity at or over a specific point or period of time and/or space. The performance measurements can be used to perform a biomechanical analysis of the performance. The system may further generate 3D avatars to visualize the performance, different aspects of it, or modified versions of it.

Another aspect of the invention relates to the generation of and applications of 3D avatars with biomechanical understanding. Biomechanical understanding is based on a domain that an activity relates to, and to points on the body that are important for performance of that action in that domain. As detailed below, the system and methods described herein can create watch lists and motion trackers. A watch list can be a list of measurable attributes of a performance for a given domain that the system is programmed to monitor or watch for. For example, the watch list may include a list of attributes that the system may measure (e.g., throughout the performance of the action). A motion tracker may include the sequence of measurements (e.g., the actual values, etc.) made throughout the performance.

Among other improvements, these aspects of the invention build on technology that just recognizes a movement or an action by analyzing the actions observed by the system to take measurements of quantifiable aspects of the performance. Those measurements can then drive biomechanical analysis of the performance and generation of 3D avatars to visualize the performance, different aspects of it, or modified versions of it. Watch lists and motion trackers can be pre-authored, created at runtime through a user interface, loaded, saved, modified and otherwise used in connection with various aspects of the invention.

Another aspect of the invention relates to developing a biomechanical understanding of an actor using a neural network. This may be used, for example, to measure human movement such as bending at the waist (forward and back), lifting (up and down movement) and sway (side to side movement). From this the system can automatically generate 3D avatars of the actor from a single-viewpoint recording and detect multiple joints through 3D pose estimation, or the conversion of a 2D pose estimation into a 3D space. The system can connect those joints to assess kinematic parameters and sequences (e.g., via motion trackers) relative to a specific domain such as sports performance, physical therapy, assessing well-being and/or other domains. For example, to determine the posture of an individual, the kinematic parameters of the joints connected to the torso may be measured and temporally tracked according to short-term degree of bend, lift and thrust across frames as well as the kinematic sequence that is observed and then statistically compared to a database to determine likely meanings of the movement.

The system may tailor the component structures of 3D avatars based on domain-specific criteria. (i.e. for some domains the system may track more points on the body than for others. For example, in baseball the system may track what the hands are doing in some detail to accurately capture the nuances of throwing, catching, and batting motions, while for soccer the system may track much less detail in the hands).

The creation of a watch list may be customized relative to each domain. This may include a weighting of the kinematic parameters and sequences based on various objectives (e.g., which are the most relevant for fault-correction within the domain). The watch lists weighting of which kinematic parameters and sequences are the most relevant within a domain may be as measured against a reference ideal for each respective motion tracker. The watch list may also determine the rank of importance for each watch list item relevant to the domain.

The weights for each domain may be determined by a machine learning model. For example, a plurality of sequential image frames or videos may be provided as input to the model. For a first domain (e.g., swimming, etc.), a kinematic parameter corresponding with a measurement of a quantifiable aspect of an actor's performance may be correlated with a ranking of a performance of the activity (e.g., the speed of swimming, etc.). Various measurements may be determined as well (e.g., moving legs more, moving wrist/arms less, etc.). The body parts, action accessories (e.g., swimsuit, cap, goggles, etc.), or actions corresponding with the greatest performance may be weighted greater than other performances. Body parts and motion sequences corresponding with the greatest performances for the domain may be added to the watch list and/or motion tracker to identify in future input to the trained, swimming-specific machine learning model. For a second domain (e.g., golf, etc.), a kinematic parameter corresponding with a measurement of a quantifiable aspect of an actor's performance may be correlated with a ranking of a performance of the activity (e.g., the accuracy of the golf swing, etc.). Various measurements may be determined as well (e.g., twisting more at the hips, following through with the golf club at the end of the golf swing, etc.). The body parts, action accessories (e.g., hat, glove, etc.), or actions corresponding with the greatest performance may be weighted greater than other performances. Body parts and motion sequences corresponding with the greatest performances for the domain may be added to the watch list and/or motion tracker to identify in future input to the trained, golf-specific machine learning model.

For purposes of example only, various aspects of the description will refer to and use the sporting examples (e.g., golf swing, etc.) as an example action. The invention is not limited to these actions and the principles and concepts may be applied to other sports or movements, including soccer, baseball, or human movements in other domains. This may include dance and other performance arts, physical therapy, or wellness assessments.

Various technical improvements are described throughout the application.

FIG. 1 illustrates a biomechanical analytics computer system, in accordance with various embodiments disclosed herein. In this example, biomechanical analytics computer system 102 may communicate with one or more user devices 130, sensors 132 via network 140 and/or other hardware and software. Biomechanical analytics computer system 102 may include processor 104 and machine-readable storage medium 106 in communication with one or more data stores, including kinematic data store 120, analytics data store 122, and avatar data store 124. Additional embodiments of biomechanical analytics computer system 102 and one or more user devices 130 are provided with FIG. 9.

Processor 104 may be one or more central processing units (CPUs), semiconductor-based microprocessors, and/or other hardware devices suitable for retrieval and execution of instructions stored in machine-readable storage medium 106. Processor 104 may fetch, decode, and execute instructions to control processes or operations for optimizing the system during run-time. As an alternative or in addition to retrieving and executing instructions, processor 104 may include one or more electronic circuits that include electronic components for performing the functionality of one or more instructions, such as a field programmable gate array (FPGA), application specific integrated circuit (ASIC), or other electronic circuits.

Machine readable media 106 may be any electronic, magnetic, optical, or other physical storage device that contains or stores executable instructions. Thus, machine-readable storage medium 106 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 106 may be a non-transitory storage medium, where the term "non-transitory" does not encompass transitory propagating signals. As described in detail below, machine-readable storage medium 106 may be encoded with executable instructions for running various processes and engines described throughout the disclosure.

Machine readable media 106 may comprise one or more applications, engines, or modules, including data processing module 108, human movement module 110, machine learning module 112, 3D avatar engine 114, watch list engine 116, and coaching feedback engine 118.

Data processing module 108 may receive data from user device(s) 130, sensor(s) 132, or other sources. The data may be stored in analytics data store 122 in association with the human user that is performing a human movement.

Data processing module 108 may adjust the quality of the image or video from user device(s) 130, sensor(s) 132, or other sources. For example, the image quality may be measured against a threshold value to determine if the image is too bright, too dark, etc. Data processing module 108 may adjust various camera characteristics and camera positions for the image or video data including, but not limited to, angle, tilt, or focal length.

Data processing module 108 may adjust the image or video by automatically changing the frames per second input value. For example, the image quality can be determined to be above the threshold value. Data processing module 108 may initiate down-sampling, compression, or decimation to resample the image or video and reduce the image quality and/or match a predetermined frames per second value.

Data processing module 108 may determine one or more derivative values (e.g., third order or jerk, fourth order or snap, etc.). The measurement of values in the motion trackers from the input images may be used to calculate the derivation of kinetic parameters from motion tracker recordings.

Data processing module 108 may also determine one or more environmental factors using one or more sensors in communication with biomechanical analytics computer system 102. The sensors may comprise image/video data to analyze the athlete's state (e.g., fatigue, strain, dehydration/hydration levels, etc.) or a sensors to collect a user's physiological state (e.g., heart rate, respiration, core body temperature, measurable body temperature, perspiration, etc.), or other information applicable to the action and/or the user's situation. Other categories may include user-generated context, comprising a self-reported mental state, determined information about the user, or potentially arbitrary information (e.g., in golf, "swing thoughts" such as "in this swing, I am focusing on my left knee flexion in the start of the downswing"; or pre-shot routines such as how many steps the user took to step into the shot, wait time before starting the swing, number of practice swings, etc.).

Data processing module 108 may also determine data based on watch list items. The watch lists and/or motion trackers can be pre-authored, created at runtime through a user interface, loaded, saved, etc.

Data processing module 108 may also determine outcome data. This may include a video of where the ball landed, trajectory information, height of ball as it traveled, or other data that can be used to correlate an athlete user's actions with the outcome it produces.

In some examples, the data are collected to collect environmental data. This may include environmental sensors (e.g., temperature, humidity, rain, elevation, local topography, etc.), including nearby objects or terrain features (e.g., in golf, trees, water hazards, sand traps, pin distance/direction/elevation, local topography, other players, golf carts, etc.), type and intensity of ambient or nearby noises, weather conditions (e.g., wind direction, wind speed, temperature, humidity, precipitation, sun angles, cloud cover, etc.).

Other categories may include domain-specific information in other categories that are context specific. For example, in golf, the par rating for the hole, which is a domain-specific piece of environmental/geographic data, or an opponent's or playing partner's current score on the hole or in the round.

Data processing module 108 may collect pre-shot data. For example, pre-shot data may comprise pre-shot thoughts or internal thoughts (intentional or unintentional) by the athlete user to identify thoughts while the user was swinging or performing some movement. The data may be collected by providing a predefined list of shots to the user interface at the user device 130, including movements/shots corresponding with laying up, shaping the shot around the obstacles, shot over, under, or around obstacles, compensating for the wind, slope of the terrain, grass type and height, landing area condition, distance to the hole and club type. The user interface may provide a text box or audio recording tool to accept comments from the user (e.g., by typing or dictating). The pre-shot thoughts or internal thoughts may be provided to machine learning module 112 to correlate as input, similar to physical movements by the user, and corresponding with mental data of the user.

Data processing module 108 may collect third party data. For example, the athlete user may provide data to a third party fitness application or device. The data from the fitness application or device may be transmitted (via near field communication, Bluetooth®, etc.) to user device 130 or via network to 140 biomechanical analytics computer system 102.

Human movement module 110 may access the images or video stored in analytics data store 122 and identify a human movement that is closest to the movement performed in the images or video. The available human movements may be stored in kinematic data store 120. In some examples, the available human movements may be stored in kinematic data store 120 may be compared with the received images or video stored in analytics data store 122. Human movement module 110 may determine the human movement with the highest likelihood of matching (e.g., the greatest percentage match, the percentage match above a threshold value, etc.).

Human movement module 110 may identify objects other than the user in the images, track kinematic parameters of the objects in the images, and generate context data based on the tracked kinematic parameters of the objects. The objects identified may vary based on the domain. For example, a juggling domain may track more than one non-user object (e.g., each of the objects that the human user is tossing and catching, etc.), while soccer may track a single object in the domain (e.g., the soccer ball, etc.).

The objects may be identified within a bounding box. For example, human movement module 110 may identify a rectangular space around the domain specific objects, including a user's body parts that correspond with the domain and any relevant non-user objects for the domain. Coordinates of the bounding box may be identified in the first image frame. As the movement progresses, the outline of the bounding box may be adjusted for subsequent image frames to encompass the same user's body parts and relevant non-user objects for the domain that were identified in the initial image frame. The objects that are captured within each bounding box may be added to the watch list and the objects that are outside the bounding box may be removed from the watch list (e.g., to help limit clutter and irrelevant objects as input to the machine learning model, etc.).

In some examples, human movement module 110 may identify pre-shot routines. For example, in a pre-shot routine, the athlete user may swing but not hit the ball (e.g., in order to warm up or practice moving the club as if the user were swinging to hit the ball). The pre-shot routing may determine actions over time, including how many steps the user took to step into the shot, the wait time before starting the swing, or number of practice swings.

In some examples, human movement module 110 may correspond with machine learning module 112 to determine a standard pre-shot routine over time. The standard pre-shot routine may be determined by calculating how many seconds did it take to complete the pre-shot routine (e.g., and hit the ball) and the relative consistency across a plurality of movements corresponding with the pre-shot routine. This can help determine when the pre-shot routine deviates from the standard pre-shot routine, including whether the pre-shot routine was consistent across different movements or shots.

Machine learning module 112 may access analytics data store 122 and learn dependencies between limbs and joints using a large set of images and video of human movements captured from user devices 130 and sensors 132. The machine learning model may be, for example, a deep convolution neural network. The mapping may be stored as a representation of available human movement kinematic data store 120.

Machine learning module 112 can determine input data needed to maximize an output value. For example, an output value may be a distance value that originates from a swinging location. The trained ML model may determine the biomechanical data that should be adjusted relative to the context data (e.g., headwind) in order to maintain a desired outcome (e.g., distance that the ball travels).

Machine learning module 112 may train one or more ML models by correlating examples of swing motions, human movements, or other performances with the outcome that were produced. Data Processing Module 108 and/or Watch List Engine 116 (described below) may record the user movement, outcome data, and context data (e.g., measurements of environmental factors) simultaneously to correlate the data with each other to create a cause and effect relationship by the model to a relatively high confidence determination.

In some examples, training the ML model may use coaches and golfing experts to identify how to improve general swings for distance and accuracy. The ML models may not be trained on previous golf swings. In this example, machine learning module 112 with data processing module 108 may provide a video or image of a golf swing to a user interface of one or more coach user devices 130. The coaches may provide instruction on which body parts to reposition or rotate at a different angle, velocity, etc. than the initial swing. The correlation between kinematic parameters (KPs) and outcome may be used to drive the training of the ML model. Once the ML model is trained (e.g., using the coach feedback), the trained ML model may receive new input images or video from an athlete user and provide output on how to adjust the swing to improve the outcome (e.g., farther swing distance, closer location to the hole, etc.).

The ML training process may also determine a weighted correlation between movement adjustment (e.g., over time) and outcome. For example, a movement of a first body part may have a higher weight value in the training than a movement of a second body part value, which causes a greater change in the outcome (e.g., greater effect on the ball distance or accuracy overall). In another example, the weighted correlation may be based on environmental factors by analyzing recorded performances captured with various environmental data to determine how the outcome changes. This can help enable biomechanical analytics computer system 102 to teach athletes how to compensate for various environmental factors using particular movement changes.

Machine learning module 112 may generate a 3D model from a 2D model. For example, data processing module 108 receives a stream of images or video from user device(s)

130, sensor(s) 132, or other sources and sends them frame by frame to machine learning module 112 as a 2D image. Machine learning module 112 may generate a 2D frame for each image frame. In some examples, each 2D frame may contain 2D coordinates for each body part or some subset thereof (e.g., the body parts or limbs that are moving in a particular context, etc.). Machine learning module 112 may collect the 2D frames and start streaming these frames to a 3D ML model. In addition to set of 2D frames, machine learning module 112 may send the 3D ML model various parameters, including body measurements, camera settings or intrinsic values, environment conditions, and the like. The output of this process may comprise a set of frames with 3D coordinates.

Machine learning module 112 may implement an inference process based on a machine-learned model. For example, the body parts included in the watch list may be tracked for movement, angle, rotation, and the like. These changes in position may be data points that are input to a machine learning model that are used to infer a resulting action in the context (e.g., jumping over a hurdle, hitting a ball with a racquet, etc.).

Figure 2:
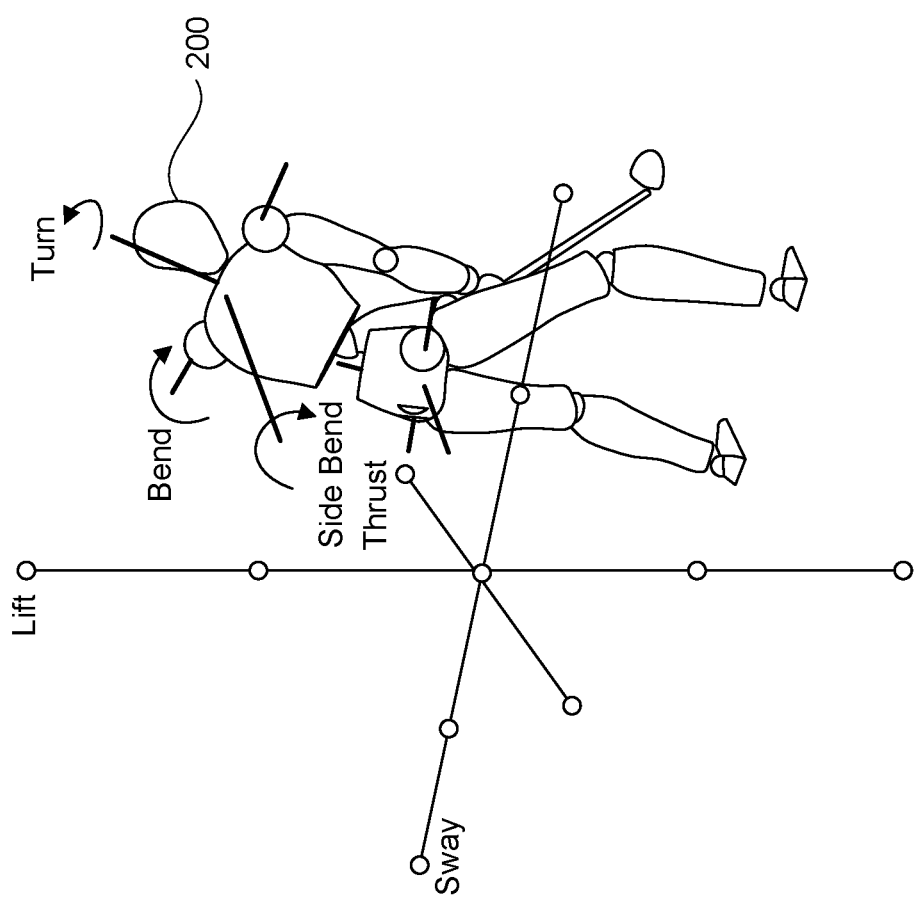
FIG. 2 illustrates 3D avatar generated by a biomechanical analytics computer system, in accordance with the embodiments disclosed herein.

Machine learning module 112 may determine the coordinates of the bounding box. For example, the bounding box may be determined based on objects identified in the image frame and/or based on similar images in the same domain during the ML training process. 3D avatar engine 114 may automatically generate a 3D avatar from images or video stored in analytics data store 122 (e.g., a single-viewpoint recording from one or more sensors 132, etc.). This may include detecting multiple joints through a 3D pose estimation. For example, a 3D pose estimation may produce a 3D pose that matches the spatial position of the depicted human (e.g., bending at the waist, twisting, etc.). An illustrative 3D avatar 200 is provided with FIG. 2.

3D avatar 200 may mimic human movement based on biomechanical limitations of the human body as well as human movement based on images and/or video received from user device 130 or sensors 132. 3D avatar 200 may be generated to comply with motion limitations that are reflective of the actual capabilities of the user. 3D avatar 200 may move along one or more three-dimensional planes, axes, or space, including an X-axis (e.g., swaying movement, etc.), Y-axis (e.g., lifting movement, etc.), or Z-axis (e.g., thrusting movement, etc.). The three-dimensional layout may correspond with a geometric layout, using the terms axes, space, and planes interchangeably. In the context of motion, "axis" or "axes" may be used since motion may be inherently one-dimensional along a direction. A combination of axes may be identified as well for a particular movement, including turning (e.g., X-axis and Z-axis, etc.), bending (e.g., Y-axis and Z-axis, etc.), and the like.

In some examples, the 3D pose estimation may correspond with a model-based generative method. For example, 3D avatar engine 114 may treat the human body as an articulated structure with a model that includes each human body part and the spatial relationship between adjacent parts. The model may remain in 3D to standardize limbs. For example, the perceived length of a limb in 2D can vary as the three-dimensional limb is projected into a 2D viewing plane, but the limb length in 3D can be constant relative to other limbs and their movements.

In some examples, the 3D pose estimation may correspond with a discriminative method or regression. After extracting features from the image, a mapping may be learned (e.g., via machine learning module 112, etc.) from the feature space to the pose space. Using the articulated structure of the human skeleton (e.g., stored in kinematic data store 120, etc.) the joint locations may be highly correlated and predictable based on the limitations of each limb/joint.

In some examples, the 3D pose estimation may predict a motion of objects in the context as well. For example, when a ball is hit, the trajectory of the ball may be mapped with the pose space performed by the avatar. The motion of other domain objects may correspond with the movement of the 3D avatar in conjunction with the limitations of the biomechanical analysis.

In some examples, 3D avatar engine 114 may detect multiple joints through a conversion of a 2D pose estimation into a 3D space and connecting those joints to assess kinematic parameters and sequences (e.g., motion trackers, etc.) relative to a specific domain.

For example, to determine the posture of an individual, the kinematic parameters of the joints connected to the torso may be measured and temporally tracked according to short-term degree of bend, lift, and thrust. The temporal tracking may be identified across frames as well as the kinematic sequence that is observed. The data may be statistically compared to kinematic data store 120 (e.g., available movements of joints and limbs, etc.) determine likely meanings of the movement. For example, a threshold amount of forward bend in the torso followed by a return to a vertical, no-bend posture may be determined to have the meaning of a "polite bow."

3D avatar engine 114 may generate a 3D avatar by tailoring the component structures of 3D avatars based on domain-specific criteria. The generation of specific criteria for domains, exceptions, and/or subdomains can enable the system to process information more efficiently. The component structures of 3D avatars may include body points that correspond with pose, movement, alignment, and other features that are related to the domain or activity.

For example, for some domains it may be desirable to track more points on the body than for others. For example, in the domain of baseball, it may be desirable to track what the hands are doing in some detail to accurately capture the nuances of pitching, throwing, catching, and batting motions. In contrast, in the domain of soccer activity, it may be desirable to track what the feet and head are doing in some detail to accurately capture the nuances of kicking and heading a ball, whereas the hands are generally not relevant. However, the system may provide for exceptions (or subdomains). For example, in the soccer domain, the hands are generally not relevant to the action. An exception relates to the goalie or when a player is doing a throw in.

These exceptions or subdomains may be handled by the system by detecting context. For example, by detecting a player who is in the goal area with their back to the goal, the system can identify this object (person) as a goal tender and it may be desirable to track what the goal tender's hands are doing in some detail to accurately capture the nuances of goal tending. When a player is doing a throw-in from a sideline, the system may use context (e.g., the fact that a player has a ball and is outside the field of play and other items of context) identify this object (person) as a player doing a throw-in and it may be desirable to track what the player's hands are doing in some detail to accurately capture the nuances of the throw-in.

In some generic systems, the movement tracking body points may correspond with generic body movements. For example, with walking, the generic system may track the movement of a user's feet, knees, arms, and shoulders that may swing forward and backward when a person walks down the street. In the improved domain-specific system, the points on the body (e.g., corresponding with the watch list, etc.) may correspond with additional points that can affect the power, speed, efficiency, accuracy, and other magnitudes of the performed movement (e.g., the distance, accuracy, height of the baseball hit by the bat, the speed of the long distance runner, the height and distance of the hurdle jumper, etc.).

In some examples, the additional body points can be used to generate a 2D model prior to generating the 3D model. As discussed herein, machine learning module 112 may generate a 2D frame for each image frame. In some examples, each 2D frame may contain 2D coordinates for each body part or some subset thereof (e.g., the body parts or limbs that are moving in a particular context, etc.). Machine learning module 112 may collect the 2D frames and start streaming these frames to a 3D ML model.

3D avatar engine 114 may generate a 3D avatar by incorporating kinematic parameters and sequences so that the 3D avatar is biomechanically representative of the intended activity. This may include accessing kinematic data store 120 to identify available human movements for the activity and associating the images/video from analytics data store 122 (e.g., using human movement module 110, etc.).

3D avatar engine 114 may apply recorded 3D motion data from a user to an avatar for various purposes. Some non-limiting example uses include the following: i) playback of the user's own performances (e.g., their own golf swing) to enable the user to watch their own performance (e.g., golf swing) from any angle so they can see what they may be doing wrong; ii) apply one user's recorded kinematic parameter sequence to another avatar, to enable a first user (e.g., a golf coach, whose swing is recorded) to model performances for a second user (the student, whose avatar is then animated using the coach's kinematic parameter sequence).

In another example, 3D avatar engine 114 may apply recorded 3D motion data from a reference video to an avatar. For example, human movement module 110 can derive a kinematic parameter sequence from a video of a reference performance of an action (e.g., a golf professional's tee shot on a 350 yard hole that breaks to the left). 3D avatar engine 114 can apply this derived kinematic parameter sequence to the user's avatar (e.g., to show the user how they should tee off on that hole).

In some examples, additional sensor data may be incorporated with 3D avatar 200 at runtime to improve the accuracy or visual appearance of 3D avatar 200, or to incorporate additional kinematic parameters/sequences (e.g., 3D motion, etc.). For example, the 3D avatar 200 can play back the user's own performances (e.g., their own golf swing) to enable the user to watch their own performance (e.g., golf swing) from any angle so they can see what they may be doing wrong. In another example, the 3D avatar 200 can perform human movement in the user's recorded kinematic parameter sequence. The movement can be used to generate a second 3D avatar to enable a first user (e.g., a golf coach, whose swing is recorded) model performances for a second user (e.g., the student, whose avatar is then animated using the coach's kinematic parameter sequence).

In some examples, data may be augmented. For example, previously recorded actions may be provided as input to the machine learning (ML) model for training. The previously recorded actions may be domain-specific, such that the ML model may be trained on the previously recorded actions to correlate how kinematic parameters/sequences can generate different results. The trained ML model may be used to analyze the user's input from user device 130 or sensors 132 and generate a motion sequence for 3D avatar 200 as output.

In some examples, performances may be modeled by 3D avatar 200 by applying kinematic parameter sequences or changes to ranges of motion in conjunction with physical simulation techniques (e.g., physics engines). For example, this may include altering values in the kinematic parameter sequence to simulate changes in performance of an action and the results of those changes (e.g., increasing the user's swing speed by 10% to simulate how far they could drive the ball). In some examples, this may include altering range of motion limitations for 3D avatar 200 to simulate reduced performance under injury or, in physical therapy scenarios, improvements to performance that could be expected with healing from injury.

In some examples, performances may be modeled by 3D avatar 200 by applying kinematic parameter sequences or changes to ranges of motion to help assess a user's change in performance over time. This may be used to gauge improvement vs. different training regimens or techniques, gauge performance loss (when to bench a player, either temporarily due to fatigue, semi-permanently due to injury, or permanently because they are unable to compete), compare measurements of motion trackers against experts or other users and ranking the user's performance against such experts or other users based on closest measurements of kinematic parameters and sequences against a target measurement or outcome (e.g. which MLB player really had the "sweetest swing" of all time?).

In some examples, performances may be modeled or simulated by 3D avatar 200 by applying kinematic parameter sequences with different context objects. For example, the simulation may be altered to show what the user could do, using the user's own motions, if they had different golf shoes, different clubs, a low-drag swimsuit, etc.

3D avatar engine 114 may generate an optimal or best avatar corresponding with a body type. For example, the system may generate a generic avatar for a subset of body types (e.g., nine general body types, etc.), age ranges, or capability thresholds. Each generic avatar may correspond with kinematic parameter sequence data that can perform optimally for that body type. For example, for users taller than six-foot, five-inches weighing less than 150 pounds, the rotation of the wrist may correspond with a first value and for users taller than six-foot, five-inches weighing between 151-200 pounds, the rotation of the wrist may correspond with a second value and the rotation of the left knee may correspond with a third value. In another example, the avatar corresponding with users over sixty-five may have a limited range of motion.

3D avatar engine 114 may generate an optimal or best avatar corresponding with a user. In some examples, the system may generate an specialized avatar for a particular user based on similar body types or a pro user with a similar body type. In other examples, the system may generate an specialized avatar for a particular user based on historical data from the user (e.g., your best swing in 2021, etc.).

3D avatar engine 114 may combine 3D avatar renderings with recorded video. For example, 3D avatar engine 114 may overlay a time-synchronized 3D avatar rendering (e.g., 3D avatar 200) with a video recording of a user's performance. This may allow the user to compare a current performance illustrated by 3D avatar 200 with a past performance (e.g., to compare this swing versus my best swing, etc.). In some examples, 3D avatar engine 114 may overlay a time-synchronized 3D avatar rendering with a video recording of a reference performance (e.g., to compare my best swing to a golf professional, etc.). In some examples, 3D avatar engine 114 may automatically detect and highlight differences between two performances.

3D avatar engine 114 may blend kinematic parameter sequence data from multiple sources to generate a fused avatar and/or kinematic parameter sequence. In some examples, 3D avatar engine 114 may combine multiple kinematic parameter sequences from the same user to determine an average performance for that user (e.g., "Your typical tee shot looks like this"). In some examples, 3D avatar engine 114 may combine kinematic parameter sequences from multiple users to determine an average performance for some action in general. In some examples, 3D avatar engine 114 may combine portions of kinematic parameter sequences from selected users to create a hybrid (e.g., tee-shot that corresponds with Tiger Woods from the waist up and Jack Nicklaus from the waist down).

3D avatar engine 114 may blend kinematic parameter sequence data from multiple sources to derive generalized insights. This may include a repetitive position or motion of a body part that is identified in a threshold number of image frames. This may include generating a generalized 3D avatar 200 relating to various factors affecting performance.

3D avatar engine 114 may generate 3D avatar 200 as a hologram. This may include applying 3D avatar technology to the hologram, virtual reality (VR), augmented reality (AR), and/or mixed-reality (MR) space. In some examples, 3D avatar engine 114 may incorporate 3D avatars into virtual reality environments (e.g., your coach's avatar can be with you at a VR Pebble Beach to demonstrate how to approach each shot). In some examples, 3D avatar engine 114 may incorporate 3D avatars into augmented reality environments (e.g., bring Tiger Woods' avatar as a hologram golfing partner to play against, while the user plays at Pebble Beach in real life). In some examples, 3D avatar engine 114 may incorporate 3D avatars as part of a mixed-reality experience (e.g., one in which the experience is an arbitrary combination of virtual and real objects and environments).

3D avatar engine 114 may transmit 3D avatar 200 to a user device. For example, 3D avatar engine 114 may send a user's performance of an action to be viewed or replayed by someone else in another location (e.g., sending your recordings to your coach).

3D avatar engine 114 may initiate a simulation. For example, 3D avatar engine 114 may initiate a competition between a human user (in real life) and a 3D avatar of the human user in VR/AR/MR (e.g., you vs. your best performance). In another example, 3D avatar engine 114 may initiate a competition between a human user against other avatars (e.g., run the 400 meters vs. Usain Bolt).

3D avatar engine 114 may use one or more 3D avatars to project a human user or a particular performance of an action into a different environment (e.g., see yourself play soccer in Wembly Stadium). In other examples, 3D avatar engine 114 may use 3D avatars for live or recorded distant messaging (e.g., appear as a 3D avatar in real time a meeting in a different city, or appear as a recorded message sent to a soldier on deployment sending an avatar message back home).

3D avatar engine 114 may generate an outcome using biomedical, biomechanical, environmental, movement suggestions (e.g., drills, progress in swing changes, etc.), or other data to generate a simulation of the 3D avatar performing the action in accordance with the suggestions from the system.

In some examples, 3D avatar engine 114 may communicate with machine learning module 112 to determine one or more relationships between the context of the action or other environmental factors (e.g. temperature, humidity, wind speed and direction), the biomechanical data, and the determined outcome of the action. The relationships may identify a weight of one or more input values (e.g., the environmental factor or the biomechanical data) with the effect on the outcome (e.g., the increased or decreased accuracy or distance, etc.). The relationships between data and ML output may be provided as feedback to the user interface of user device 130. In some examples, user-provided feedback on their swing thoughts, psychological state, breathing, biomechanical data (e.g., leading up to and in the moment of the execution of the action) may be added as input to the ML model to determine the relationship between the context data, user provided data, and the outcome.

Watch list engine 116 may generate a watch list and/or motion tracker. The watch list may correspond with a list of measurable attributes of a performance that the system is programmed to monitor or watch for (e.g., in images or video from user device 130 or sensors 132, etc.). For example, the watch list may include a list of attributes that the system may measure (e.g., throughout the performance of the action). A motion tracker may include the sequence of measurements or actual values that are generated throughout the performance.

Watch list engine 116 may create one or more watch lists relative to each domain. This may include weighting which kinematic parameters and sequences are the most relevant for analysis within that domain. As one example, the analysis may be used to aid in fault-correction. As a result, the weighting of which kinematic parameters and sequences are the most relevant for analysis within that domain may take into account the common faults within the domain.

Watch list engine 116 may incorporate the watch lists and motion trackers with 3D avatars. Motion trackers track the movement of domain-specific kinematic parameters and sequences. The movement may include, for example, sway, thrust, and lift as well as the rotational movement of each kinematic parameter. This may help track human-like movement including bend, turn, rotation velocity, rotational angles, rotational space, or rotational sequence of kinematic parameters. Watch lists may include a weighting of which kinematic parameters and sequences are the most relevant for fault-correction within the domain as measured against a reference ideal for each respective motion tracker. The watch list may also include a ranking or a relative ranking of importance for each watch list item relevant to the domain.

Watch list engine 116 may incorporate additional information with 3D avatar 200. In some examples, the watch list can include temporal measurements to track time-related concepts such as tempo, beat, and rhythm. The temporal measurements can be incorporated with 3D avatar 200 to further correspond with human movement.

Watch list engine 116 may generate a dynamic watch list. Dynamic watch lists may be created dynamically through a user interface at user device 130 by selecting (e.g., by selecting, tapping on, etc.) an actor's components and/or on context objects. Once the actor's components and/or on context objects are selected, one or more motion trackers may determine the kinematic parameters (e.g., position, velocity, acceleration, etc.) of those components and context objects, individually or in groups. The motion trackers may form a dynamic watch list as a list of things the system is watching in order to assess a performance of an action. Watch lists can enable tracking of, and analytics on, the kinematic parameters for all indicated components throughout the actor's performance of some action. In some examples, the actor's performance may be compared with a stored performance (e.g., viewing a trace of the line between the user's elbows, wrists, and the head of a golf club throughout a golf swing, etc.).

Coaching feedback engine 118 is configured to generate step-by-step images of movements illustrated as an avatar moving through a kinematic motion. The avatar movements may correspond with proper movements that are generated by coaching feedback engine 118 as coaching feedback to improve the suggested movement. Illustrative examples of the avatars movement are provided with FIG. 15.

The avatar movements and set of suggestions may be stored with avatar data store 124. Avatar data store 124 may comprise 3D avatars that are generated by coaching feedback engine 118 and one or more user generated suggestions of how to achieve the illustrated movement performed by the avatar. The movement of each avatar may be limited by biomechanical limitations of the user's body defined in kinematic data store 120. The 3D avatars may simulate human movement based on machine readable instructions that correspond with biomechanical limitations determined by the system.

Coaching feedback engine 118 is also configured to detect one or more flaws in the user's movement. For example, the flaws may be identified by comparing attributes of a single KP or combination of KPs of a new movement with the stored or ideal movement at a particular position or moment in time. When the received movement is out of range of the stored movement, coaching feedback engine 118 may identify the received movement as being out of range of the ideal movement and unable to maximize the outcome (e.g., faster swing speed, fixing a slice or improperly hitting an object, or hitting a trick shot, etc., each of which may correspond with a machine learning model for maximizing that particular outcome).

Kinematic data store 120 may comprise a plurality of the available human movements that can be performed by human users. These limitations may correspond with the movement of joints and limbs in the human body and identify a range of motion.

Analytics data store 122 may comprise images of human users captured by sensors 132. In some examples, the data may also comprise interactions and/or feedback from human users as provided to a user device 130 and transmitted via network 140 to biomechanical analytics computer system 102. In some examples, the feedback may include a comment from a user or coach (e.g., voice or text) or comments on a session from other users (e.g., a session corresponds with a plurality of actions associated with a user during a time frame, etc.).

User device(s) 130 may comprise one or more processors, machine-readable storage media, interfaces, and/or sensors. For example, the interface may display information (e.g., generated and transmitted by biomechanical analytics computer system 102, etc.) and may receive feedback from the user through interactions with the interface. The feedback may be transmitted to biomechanical analytics computer system 102 and processed by data processing module 108.

Sensor(s) 132 may comprise one or more cameras for capturing images and video of human movement. The human movement may include bending (e.g., at the waist, forward and backward, etc.), lifting (e.g., up and down movement, etc.), swaying (e.g., side to side movement, etc.), and various other movements that may be performed. The images and video may be transmitted to biomechanical analytics computer system 102 and processed by data processing module 108.

Sensor(s) 132 may comprise accelerometers, stress or strain gauges, or other sensors that can measure motion or activity. These sensor values can be helpful for measuring kinematic parameters that may be difficult to assess visually (e.g., through camera images, etc.). Network 140 may comprise a two-way communication network for transmitting signals that carry digital data streams representing various types of information. Additional information regarding network 140 and corresponding components is provided with FIG. 25.

Figure 3:
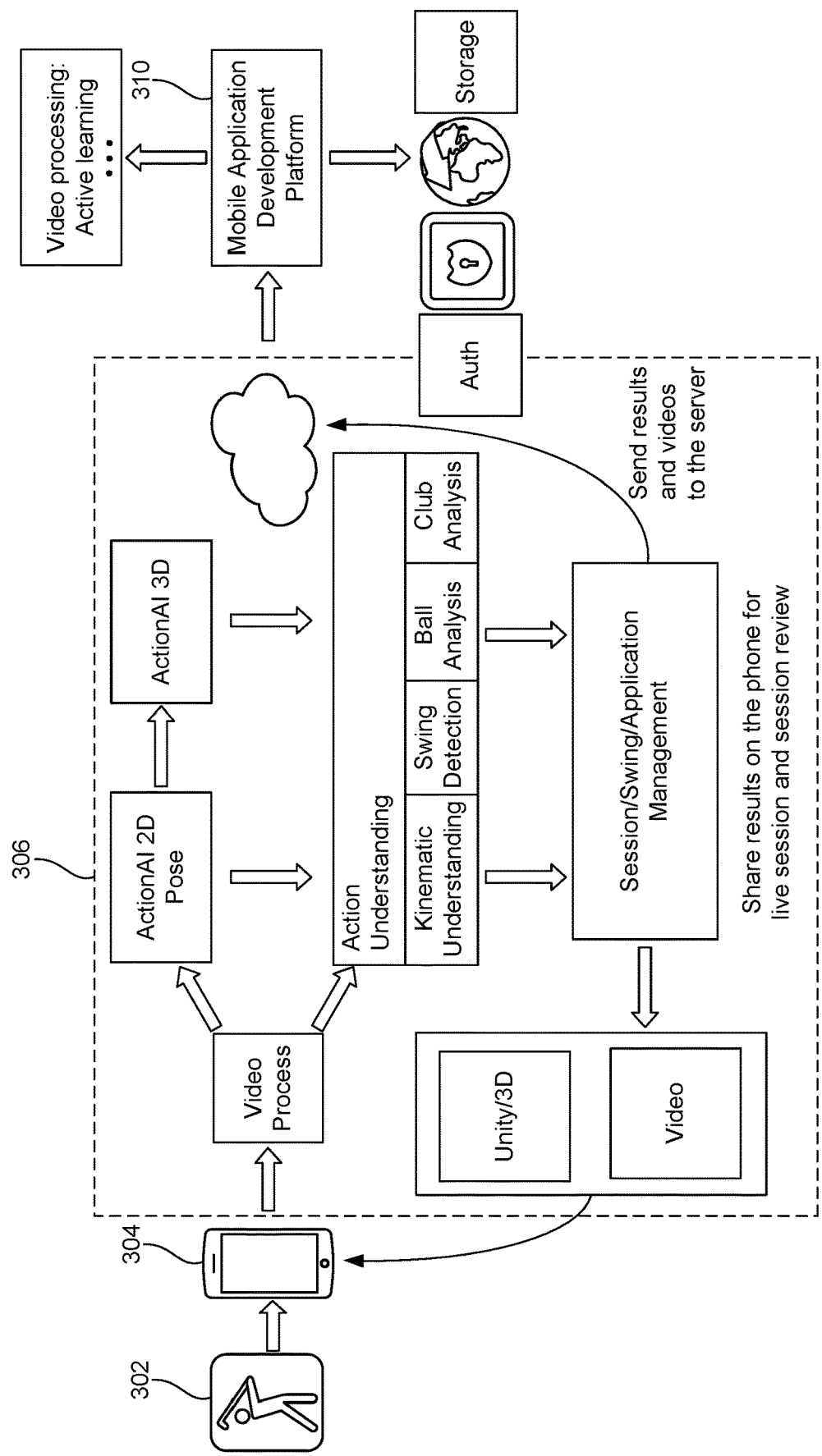
FIG. 3 is an illustrative process for determining 3D human movement, in accordance with the embodiments disclosed herein.

FIG. 3 is an illustrative process for determining 3D human movement, in accordance with the embodiments disclosed herein. In the illustrative process, an actor's performance 302 may be recorded by user device 304 and transmitted to biomechanical analytics computer system 306. The performance may be processed and analyzed, and a 3D avatar may be generated. User device 304 and biomechanical analytics computer system 306 may be similar to one or more user devices 130 and biomechanical analytics computer system 102 illustrated in FIG. 1.

A user may operate user device 304 to access a registration or sign-up portal. A user profile may be generated and stored with the system. User device 304 may access a login network document to provide user credentials and/or password to gain access to the system.

User device 304 may start a new recording of the action comprising the human movement. The camera may be configured to record the action and to help improve 2D and 3D accuracies. In some examples, the system may determine camera characteristics such as type of the camera, focal length, angle, and/or tilt using a Software Development Kit (SDK) and/or Application Programming Interface (API) to determine the camera characteristics from the user device. In some examples, a camera setup or other instructional video may be provided to the human user to help setup the camera.

In some examples, user device 304 may execute a camera application to capture a set of different movements. For example, the camera application may determine a magnitude of an object within an image frame. This data may be used by the camera application (or transmitted to biomechanical analytics computer system 102) to correct balance, shutter speed, light, focal length, etc. to captured objects.

In some examples, the camera may start recording automatically once the camera set-up is completed. The camera may record continuously. In some examples, user device 304 may keep only store frames from the start of a "real" action (as detected by user device 304) to the end of action. Practice actions or performances may be discarded. A "real" action may be defined as when contact with the ball/equipment has been made or when music starts.

In some examples, the camera application may be optimized to capture objects that are recognized in the particular context. For example, objects in the image frame may be compared with a data store of known objects, including various types of sports equipment, accessories, and the like. When an object is identified, the corresponding context may be associated with the image frame as including the equipment or accessory corresponding with the domain/activity.

In some examples, the camera measurements may be used to generate 3D model coordinates. For example, the known distance between a user and a camera may be used to determine a distance between two shoulders on a user or the length of a golf club. This information may be transmitted to the artificial intelligence (AI) library or data store to compute the kinematic parameters.

Human characteristics may be determined as well. Human characteristics may include body measurements (e.g., height, weight, shoulder size, pelvis size, etc.) to improve 2D and 3D accuracies. To determine the body measurements, user device 304 may request the information (e.g., what is your height, etc.). In some examples, the body measurements may be determined programmatically using high definition photos and computer vision algorithms (e.g., using a vanishing point calculation, using a reference height, etc.). In some examples, a bounding box may be determined around the human user before the human movement is recorded. The system may provide feedback to the human user via user device 304 if bounding box is in the view. If it is not, the feedback may include instructions where to move so that the bounding box is in view (e.g., move left, move right, step backward or forward, etc.).

User device 304 (or biomechanical analytics computer system 306) may update the user interface with a confirmation that user device 304 is ready to record and/or instruction for the user to begin their performance of an action (e.g., jump, swing, juggle, etc.). The user interface may give confirmation (e.g., that the recording was successful) after every performance when the performance is captured (e.g., audio and visual).

In some examples, the user may provide visual or audible information about the action. For example, a user may confirm with hand gesture whether the swing was good, bad, or average. The hand gesture may be captured in an image frame at user device 304 and provided as input to a trained machine learning model to determine the command/action corresponding with the gesture.

In some examples, user device 304 may register the action data based on user confirmation (e.g., the hand gesture is compared with a predetermined movement identifying a confirmation within a threshold value, etc.). In some examples, the registration of the action data may include transmitting the action data to biomechanical analytics computer system 306.

User device 304 may receive one or more interactions from the user. The interactions may select one or more components for tracking, including clicking or tapping on pictures, video, or other representations of an actor or context object, or selecting components or context objects from lists presented to the user. In some examples, the interactions may include selecting components or context objects through natural language requests (e.g., "watch my elbows, wrists, and the club head").

Figure 4:
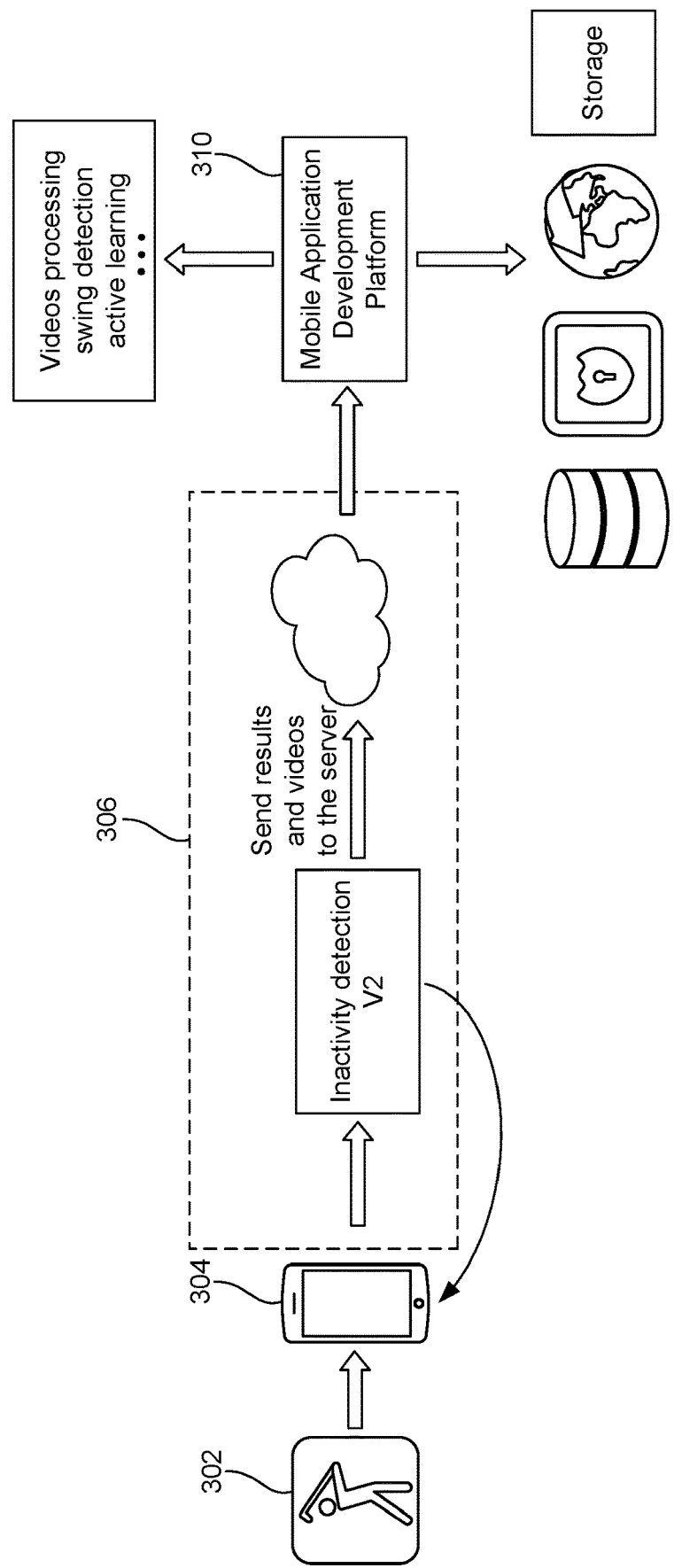
FIG. 4 is an illustrative process for interacting with a user device, in accordance with the embodiments disclosed herein.

In some examples, user continues to perform the action (e.g., swing). After each performance, a user confirmation may be provided to user device 304. The action may be ended when the user moves (e.g., walks, etc.) out the camera scope. User device 304 may stop capturing once user leaves the screen or other inactivity is identified, as illustrated with FIG. 4. In some examples, rather than a live action video, the action may be performed in a recorded or existing video (e.g., from user device data store, from an online data store accessible by a uniform resource location (URL), etc.). The swing analysis may be transmitted to user device 304 when user returns to viewing user device 304.

In some examples, the user may be asked to align the golf ball with a white circle on the screen. This can determine the distance of the camera from the ball. There may also be a white line to help adjust the tilt of the camera to the correct level. Voice (text to speech vs recorded) prompts may guide the user to adjust the camera or move left, right, closer or away until a "ready" textual or audio signal. From that field of view, the camera parameters may automatically be determined, including the zoom setting, shutter speed, and ISO parameters (e.g., the camera sensor's sensitivity to light).

Biomechanical analytics computer system 306 may group selected components into a watch list for subsequent use or analysis. For example, the system may automatically determine a set of components constituting a watch list through comparison of a user's performance of an action to a recording of an example performance. The watch list may be authored through programming and editing tools, such that the watch list can be saved, loaded, built into or imported into applications, selected and activated by users, and the like.

The watch list may be used to record the kinematic parameters (e.g., positions, angles, velocities, etc.) of the components in the watch list during the performance of the action. The analysis of the performance may use the recorded kinematic parameters, for example, by measuring quantities of interest of the performance (e.g. speed of the club head), generating visualizations of the performance (e.g. a graph of club-head-speed vs. time), generating graphical overlays representing aspects of the performance, to be displayed over or along with images, video recordings, or digital renderings of the performance, and/or automatically determining best or worst performances by comparing a kinematic parameter sequence to a reference sequence or other prior sequences.

Information may be provided back to user device 302 based on the results of watch list analysis. For example, the information may include advertisements, coupons, or other commercial opportunities such as purchase recommendations. As an illustration, if analysis of the user's performance shows that a certain kinematic parameter (e.g., a foot position, etc.) moves beyond a desirable range, the advertisement may include golf shoes with cleats for better grip. In another example, the information may include recommendations for corrective actions from analysis of the recorded kinematic parameters. As an illustration, the system may generate a suggestion on how the user should alter their performance to bring their kinematic parameters into better agreement with reference or idealized kinematic parameters for that action (e.g., within a threshold value between the recorded action and the parameters, etc.). In another illustration, the system may observe general performance degradation that indicates the user should rest or get food/water.

Figure 6:
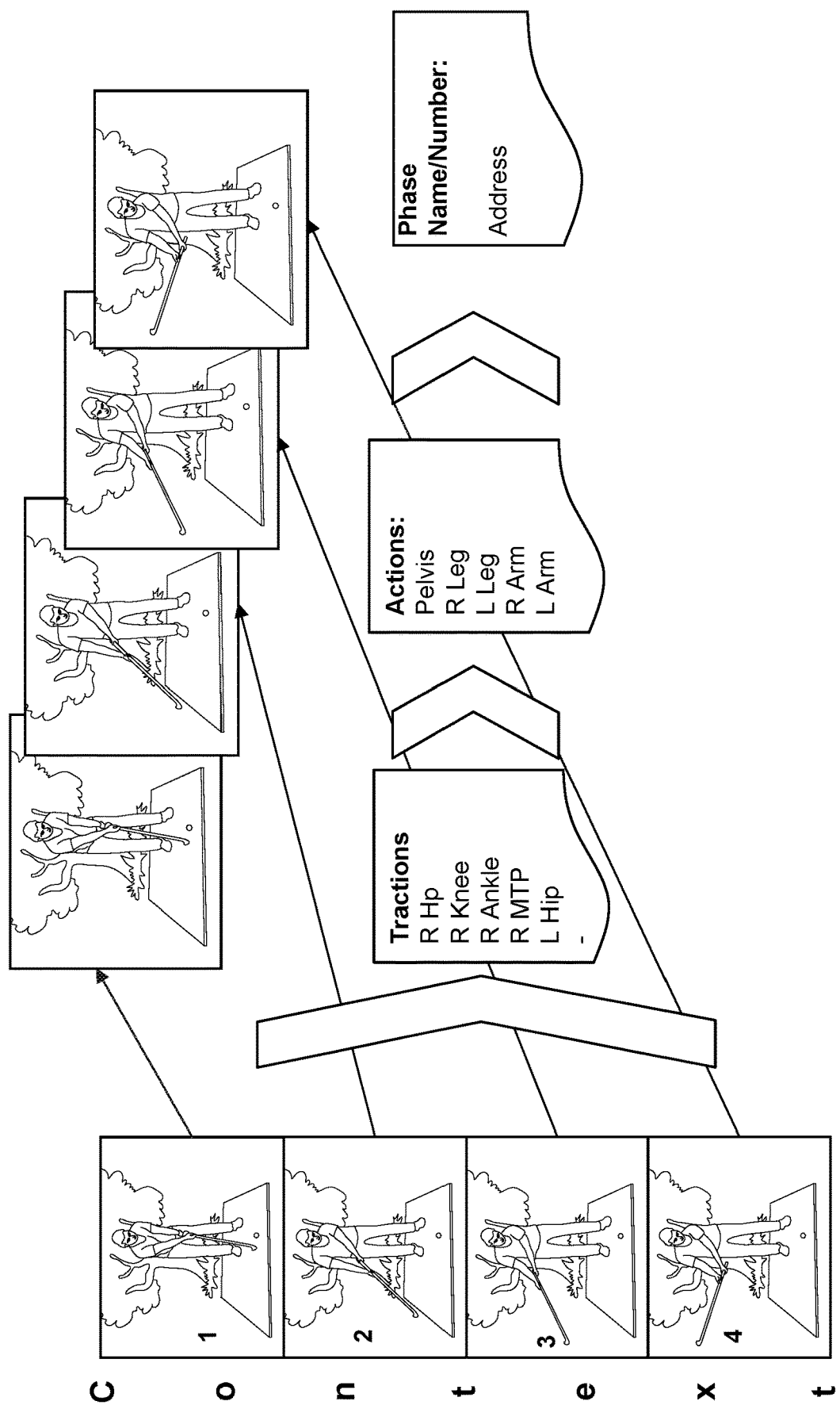
FIG. 6 illustrates a process for determining human movement, in accordance with the embodiments disclosed herein.

The suggestions may correspond with the kinematic parameters (e.g., positions, angles, velocities, etc.) of the components in the watch list during the performance of an action. For example, the positions of the action for golf may include a top of the swing, an end of the swing, tracking movements of the user's wrist, a golf dub position at particular swing location, and the like, as illustrated in FIG. 6. The suggestions may offer changes to the positions identified for the domain.

In some examples, the suggestions may correspond with changing inputs to data processing module 108. The suggestions may correspond with adjusting various camera characteristics and camera positions for the image or video data at user device 304 including, but not limited to, angle, tilt, or focal length. In some examples, different camera angles may be suggested based on swing location (e.g., to see the changes at the most visible angle, etc.). In some examples, additional sensors may be recommended to capture data in addition to image date (e.g., magnitude, speed, direction, etc. using a gyroscope).

In some examples, biomechanical analytics computer system 306 may correlate the results of watch list analysis with additional context data to affect what information is presented to the user (e.g., correlating the likely detection of fatigue in the user with GPS information to surface advertisements for nearby restaurants or cafes where the user could rest and obtain food/drink before their next round of golf). Categories of context information can include, for example, historical records from the user's prior performances (e.g., in golf, the results of the user's previous shot, their prior performance on this same hole, etc.), environmental data like geographic location data (e.g., where the user is at the time of the analysis pursuant to presenting information, etc.), nearby objects or terrain features (e.g., in golf, trees, water hazards, sand traps, pin distance/direction/ elevation, local topography, other players, golf carts, etc.), type and intensity of ambient or nearby noises, weather conditions (e.g., wind direction, wind speed, temperature, humidity, precipitation, sun angles, cloud cover, etc.), user's physiological state (e.g., heart rate, respiration, temperature, perspiration, etc.), or other information applicable to the action and/or the user's situation. Other categories may include user-generated context, comprising a self-reported mental state, determined information about the user, or potentially arbitrary information (e.g., in golf, "swing thoughts" such as "in this swing, I am focusing on my left knee flexion in the start of the downswing"; or pre-shot routines such as how many steps the user took to step into the shot, wait time before starting the swing, number of practice swings, etc.). Other categories may include domain-specific information in other categories that are context specific. For example, in golf, the par rating for the hole, which is a domain-specific piece of environmental/geographic data, or an opponent's or playing partner's current score on the hole or in the round. The watch lists and/or motion trackers can be pre-authored, created at runtime through a user interface, loaded, saved, etc.

User device 304 may access an analyzed session, human movement, action, or other information generated by biomechanical analytics computer system 306 and present the information to the user interface of user device 304. For example, to find an analyzed session, the user may access a "Swings" tab and default land on the "Sessions" tab. The user may review the list of sessions (e.g., with the most recent session on top, etc.) through a search feature. The search feature may include a filter or sort feature to organize the sessions or other information.

In some examples, user device 304 may access a 3D avatar that can switch between 2D (e.g., image frames, video, etc.) and suggestions on improving actions. For example, the user interface may be updated to show functions of action tips (e.g., "swing genius" on or off), 2D/3D mode, and video play controls. The interface may be updated with a 3D avatar analysis, 2D avatar, point of view (POV), change 2D to 3D, or other information. In some examples, user device 304 may create a watch list by first identifying a reference action in 2D or 3D and then identifying joints or other human movements.

The analyzed information may be provided back to a machine learning model for post analysis training. For example, the user may generate the watchlist item from a previous session stored in a data store or a current action provided within a session. The watchlist item and/or action may be provided to the machine learning model. In another example, the user may set up the camera or other sensor and start recording. When the user is practicing the action and not providing a confirmation, the actions may not be uploaded to biomechanical analytics computer system 306. When the user is practicing the action and providing a confirmation (e.g., thumbs up, etc.), the actions may be uploaded to biomechanical analytics computer system 306. Once analyzed, biomechanical analytics computer system 306 may transmit a summary of the analysis to show progress, areas of improvement, whether the user did well with the watchlist item or not, or other information. After each shot, the user interface may be updated to provide the summary (e.g., watchlist item 1, 2, 3 at 40%, next shot should be 50%, etc.). After a threshold number of actions (e.g., after 5 actions), when the user is not improving a threshold value (e.g., not twisting 5% more, etc.), the system may suggest the user review additional information (e.g., watch an instructional drill video, etc.) or perform particular actions (e.g. do a practice drill).

User device 304 may provide access to historical actions, statistics, and determined information for the user's actions or a different user's actions (e.g., expert user, friend, model action, etc.). The information may be provided through the user interface.

In some examples, user device 304 may provide access to action statistics. The statistics screen may automatically disappear when the user starts swinging. The user may hear the key statistics in a text to speech prompt. This may also signal that the action was successfully captured. The audio prompt may be cut short if the user starts performing the action again. If the user is out of frame in their subsequent actions, user device 304 may use voice prompts to direct them back into the frame. The user may have the option to indicate their satisfaction with the shot with hand signals or voice command after every action. This may be used in the session summary and tied to the user's analytics (e.g., action score and/or quality, watchlist item score, consecutive good performances, etc.).

Mobile application development platform 310 may determine and/or store a user's interactions and session information with biomechanical analytics computer system 306. In some examples, mobile application development platform 310 may determine and/or store raw data like videos, images, environment conditions, and the like. The data may be received by biomechanical analytics computer system 306 data for various analytics reports or other processing.

FIG. 5 is an illustrative human movement, in accordance with the embodiments disclosed herein. In the illustration, a human movement is performed relating to a sport of golf, although any context may be applicable. The human user may be centered in an image frame (e.g., through feedback from the registration and setup process, etc.) and the user device may record one or more image or video frames of the human movement.

In some examples, the user may register with the system. This may include determining one or more objects in the image frame to identify the context/domain of the activity, determining the distance between the user and the camera using a known item measurement (e.g., placing a golf ball between the user's feet and using that measurement to determine measurements for the rest of the body, etc.), or other human characteristics (e.g., questioning the user on their height, weight, shoulder size, etc.).

The video processing may occur at user device 304, biomechanical analytics computer system 306, or a hybrid approach. In the hybrid approach, user device 304 may record the video and biomechanical analytics computer system 306 may process video (e.g., if the network connection is faster than a threshold value to permit streaming media with minimal delay, etc.). Biomechanical analytics computer system 306 may store all generated and raw data, which can be used for improving the system, generating analytics, and providing information to the user about past sessions and actions.

FIG. 6 illustrates a process for determining human movement, in accordance with the embodiments disclosed herein. In the illustration, the image frames are analyzed through the progression of the human movement. A context or domain may be determined through an image analysis process. The image frames may be separated into a set of movements and each movement in the set of movements may be compared to determine which body parts are participating in the human movement.

The image frames may be captured in a predetermined time interval (e.g., every half-second, every 10 milliseconds, etc.). The sensor(s) used to capture the action may be triggered along the time interval. This may include visual characteristics of the image captured by a camera, motion or magnitude values captured by a motion sensor (e.g., to determine speed, direction, etc.), or other values described throughout the disclosure. As illustrated, four images are captured to determine the context of the action, including four different positions of a swing in the activity/domain of golf.

Figure 7:
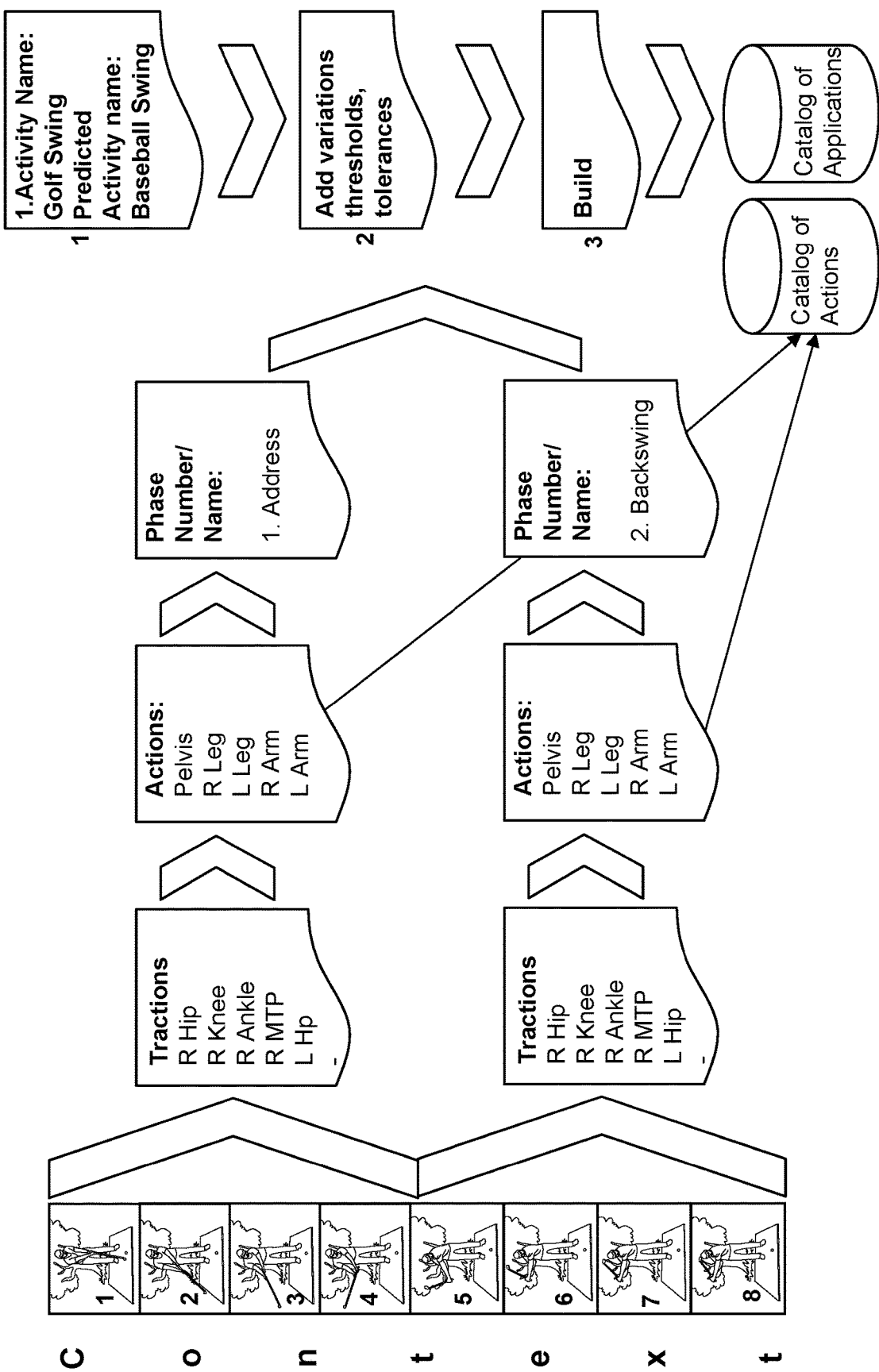
FIG. 7 illustrates a process for determining human movement in a particular context, in accordance with the embodiments disclosed herein.

FIG. 7 illustrates a process for determining human movement in a particular context, in accordance with the embodiments disclosed herein. In the illustration, each movement in the set of movements is compared with a pre-determined human movement stored with biomechanical analytics computer system 306. For example, the system may measure the human movement such as bending at the waist (forward and back), lifting (up and down movement) and sway (side to side movement) to detect multiple joints through 3D pose estimation. From this, biomechanical analytics computer system 306 can automatically generate 3D avatars of the actor from a single-viewpoint recording and detect multiple joints through 3D pose estimation, or the conversion of a 2D pose estimation into a 3D space.

Figure 8:
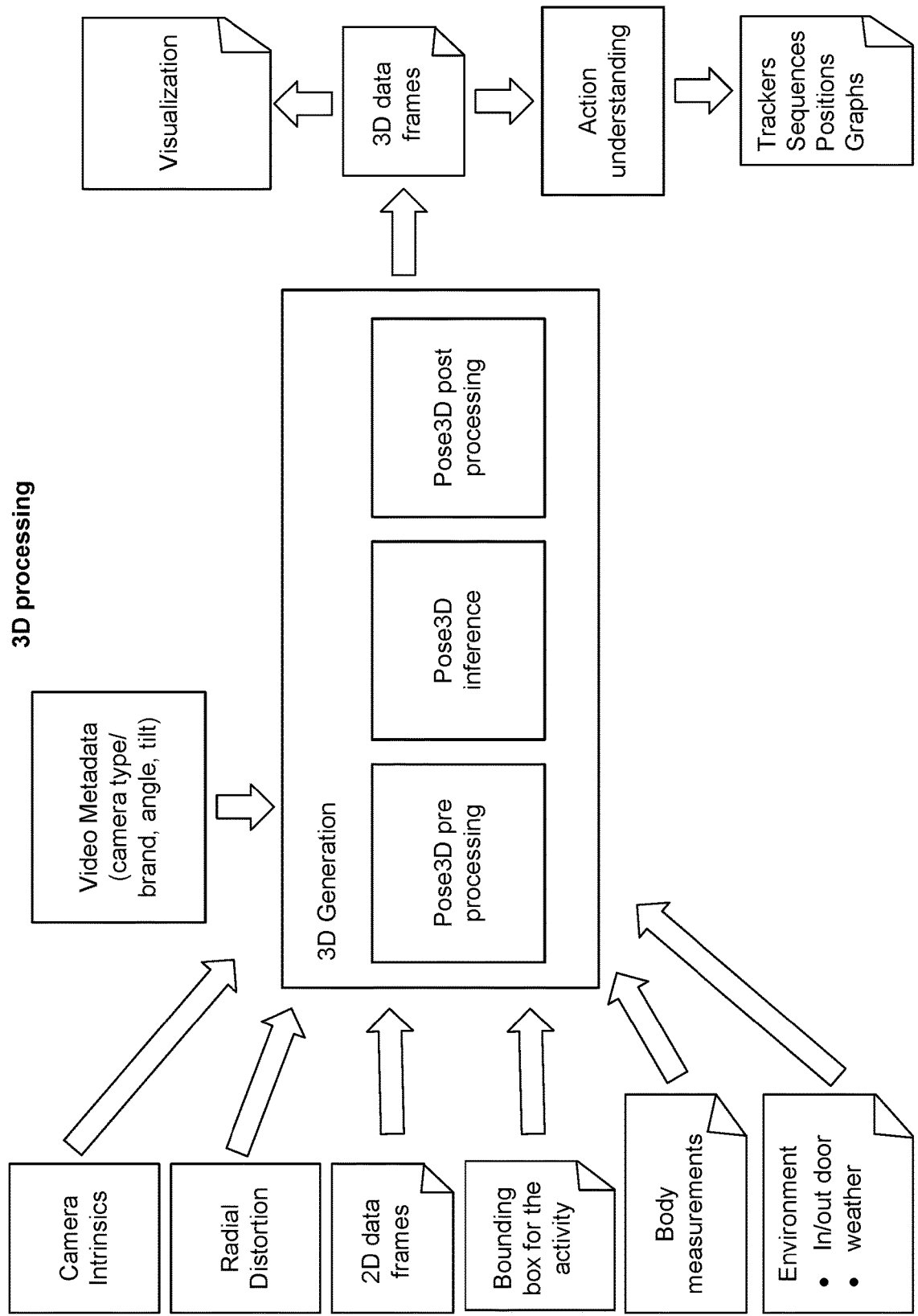
FIG. 8 provides illustrative 3D processing, in accordance with the embodiments disclosed herein.

FIG. 8 provides illustrative 3D processing, in accordance with the embodiments disclosed herein. In the illustration, data points are received from various sources, including video metadata (e.g., camera type, camera brand, angle, tilt, etc.), camera intrinsic details, radial distortion 2D data frames, bounding box for the activity, body measurements, and/or environmental data.

In some examples, the human movement is determined (e.g., golf swing) and various other human movements in a similar context can be compared. The origin of the other human movements can include, for example, various golf videos, the watch lists, context information, and the like. These similar human movements can be compared to generate a 2D post estimation in a 3D space, or a 3D avatar performing a representation of the human movement. In some examples, the kinematic parameter sequences from each analyzed human movement may combine portions of kinematic parameter sequences from selected users to create a hybrid (e.g., tee-shot that corresponds with Tiger Woods from the waist up and Jack Nicklaus from the waist down) or from the same user to determine an average performance for that user (e.g., "Your typical tee shot looks like this").

In some examples, once the context and image frames are processed and analyzed, the activity and/or context may be determined (e.g., golf swing). If the activity can be identified, the user interface at user device 304 may be updated with relevant information. If the activity cannot be identified, further analysis of the activity may be performed.

The 3D generation process may include pre-processing, inference, and/or post-processing. For example, the data pre-processing can include the data cleansing process performed by data processing module 108. Some examples for data pre-processing includes outlier detection, missing value treatments, and removal of the unwanted or noisy data. In some examples, post-processing may comprise real-time 3D rendering to generate the 3D avatar and/or additional effects (e.g., domain object, environment data, etc.).

The 3D generation process may generate one or more 3D data frames. For example, the 3D avatar may be adjusted into a 3D movement that are limited by biomechanical data. Each movement may be stored as a 3D data frame.

In some examples, the 3D avatar movement in 3D data frames can generate a visualization of human movement. For example, a sequence of KP and/or coordinates of the 3D avatar may be provided to an open source software application. The open source software application may generate an animation that the 3D avatar may follow to follow with the sequence of KP and/or coordinates.

In some examples, the 3D avatar movement in 3D data frames can generate an action understanding of human movement. For example, the 3D image frames may be correlated as forming an activity for the domain. The action understanding may correspond with recognizing several individual movements as belonging to one action.

The action understanding may provide input data for motion trackers, sequences, positions, graphs, or other information. In some examples, the identified action may be compared with an ideal action or some other reference.

Figure 9:
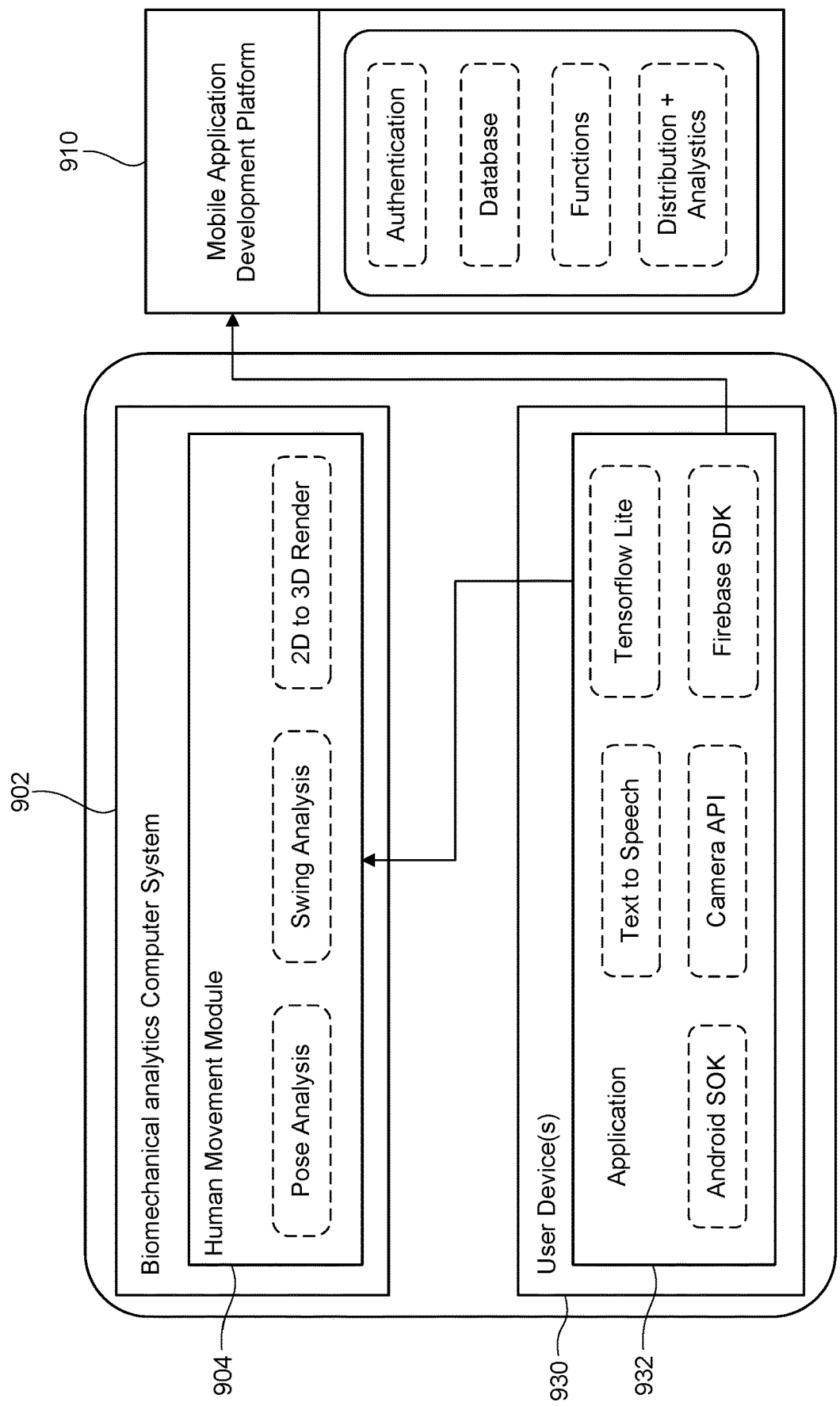
FIG. 9 illustrates a biomechanical analytics computer system, user device, and mobile application development platform, in accordance with the embodiments disclosed herein.

FIG. 9 illustrates a biomechanical analytics computer system, user device, and mobile application development platform, in accordance with the embodiments disclosed herein. In this illustration, biomechanical analytics computer system 902, mobile application development platform 910, and user device(s) 930 may be in communication to analyze and generate 3D avatars using biomechanical analysis. Biomechanical analytics computer system 902 and user device(s) 930 in FIG. 9 may correspond with biomechanical analytics computer system 102 and user device(s) 130 in FIG. 1.

Biomechanical analytics computer system 902 may comprise human movement module 1004. Human movement module 1004 may implement a pose analysis, action (e.g., swing, etc.) analysis, and a 2D to 3D model rendering. These operations may be limited based on biomechanical limitations of the human body, human movement, and object tracking. The pose analysis, action analysis, and a 2D to 3D model rendering may be generated using machine learning and/or computer vision processes.

User device(s) 930 may receive one or more image frames from a human movement using an application 932 installed with the user device. One or more tools may be incorporated with the user devices as well, including text to speech, a data library for numerical computation and machine learning, SDK, and/or APIs to run components described with the human movement module 1004.

Mobile application development platform 910 may comprise cloud resources for storing and/or executing operations. The data structure and/or operations may support biomechanical analytics computer system 902 in a cloud computing environment. For example, mobile application development platform 910 may comprise authentication, one or more databases, machine-readable instructions and/or functions, and distribution or analytics data to perform persistence and storage operations.

Figure 10:
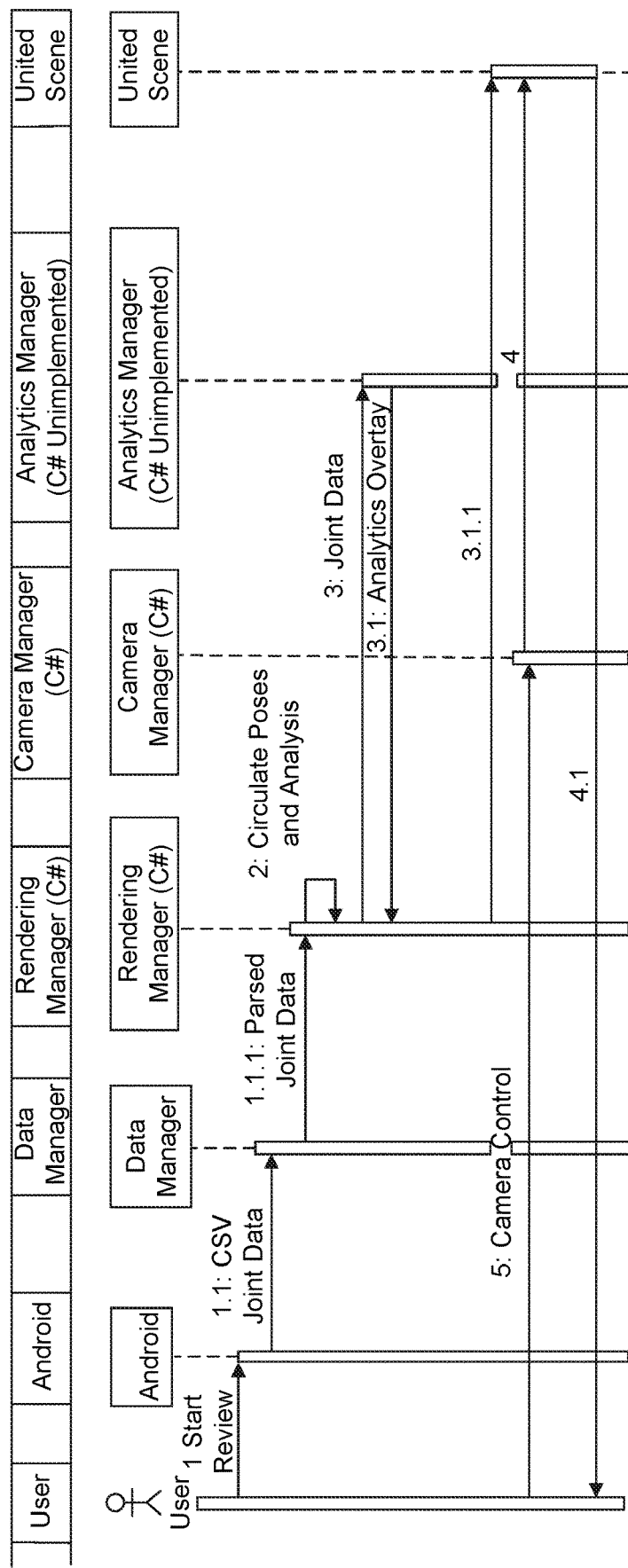
FIG. 10 illustrates receiving a 3D avatar at a user device, in accordance with the embodiments disclosed herein.

FIG. 10 illustrates receiving a 3D avatar at a user device, in accordance with the embodiments disclosed herein.

At block 1, a user may review an application at a user device. The user device may capture one or more images or videos of the user. The image frames may comprise biomechanical values, body parts or joints, or other data corresponding with the user or other characteristics of the image frame. The image frames may be stored at the user device.

At block 1.1, the image frames, biomechanical values, and other data may be transmitted to a data manager. The data may be transferred as a machine-readable file (e.g., comma separated value (CSV), etc.). The data manager may be incorporated with biomechanical analytics computer system 102 (e.g., data processing module 108).

At block 1.1.1, the data may be parsed and/or otherwise cleaned by biomechanical analytics computer system 102. The parsed data may be transmitted to a rendering manager. Rendering manager may be incorporated with biomechanical analytics computer system 102 (e.g., data processing module 108, human movement module 110, etc.).

At block 2, the rendering manager may determine poses or other analysis associated with the motion sequences identified in the image frames. In some examples, the joints used to perform the poses may be determined.

At block 3, the rendering manager may transmit the joint data and/or other pose data to an analytics manager. The analytics manager may determine an overlay corresponding with the joints that perform the poses. The analytics manager may be incorporated with biomechanical analytics computer system 102 (e.g., human movement module 110).

At block 3.1, the overlay may be transmitted from the analytics manager back to the rendering manager. The rendering manager may generate a time-synchronized 3D avatar rendering and overlay the 3D avatar with additional data. The additional data may include, for example, a video recording of a user's performance, to allow the user to compare current performance with past performances (e.g., "show this swing versus my best swing"), a video recording of a reference performance (e.g., "show my best swing versus a specific pro golfer"), and/or automatically detecting and highlighting differences between two performances.

At block 3.1.1, the rendering and overlay may be transmitted by the rendering manager to a unity scene device. The unity scene device may combine the multiple layers (e.g., avatar, overlay, etc.) with newly recorded video (e.g., blocks 4 and 5, etc.).

At block 4.1, the rendering, overlay, and/or additional image frames may be provided back to the user via the user device.

Figure 11:
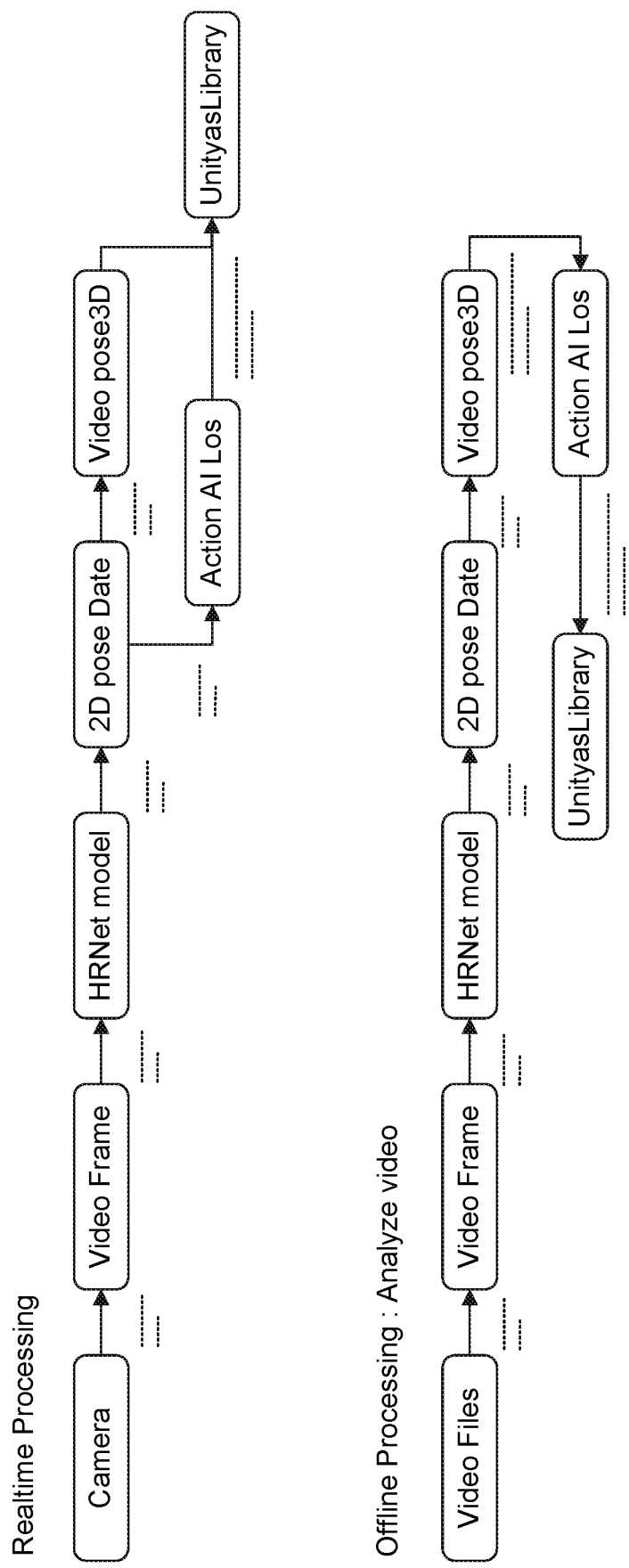
FIG. 11 illustrates generating a 3D avatar at a biomechanical analytics computer system, in accordance with the embodiments disclosed herein.

FIG. 11 illustrates generating a 3D avatar at a biomechanical analytics computer system, in accordance with the embodiments disclosed herein.

In real-time processing, the camera or other sensor may generate image or video frames of the human movement. The captured image or video frames may be stored in a 2D format and/or compared with an library of predetermined poses (e.g., HR-net*, open pose, Google pose net, etc.). The output of the comparison may determine 2D pose data and/or context information associated with the pose. The information may generate one or more image frames that correspond to motion performed by a 3D avatar.

In offline processing, the image or video frames may be received in a 2D format (e.g., from a data store, from a camera or sensor, etc.) and/or compared with an library of predetermined poses (e.g., HR-net*, open pose, Google pose net, etc.). The output of the comparison may determine 2D pose data and/or context information associated with the pose. The information may generate one or more image frames that correspond to motion performed by a 3D avatar.

FIG. 12 illustrates a data store storing watch list data for a 3D avatar, in accordance with the embodiments disclosed herein. The data store may include watch list information, including a watch list identifier (ID), user ID, score, date, point of view, zoom level, and one or more trackers.

FIG. 13 illustrates a data store storing tracker data for a 3D avatar, in accordance with the embodiments disclosed herein. The data store may include tracker information, including a tracker identifier (ID), tracker name, category, description to define the tracker, tracker type (e.g., dynamic or static), and/or measurement unit.

FIG. 14 illustrates a data store storing watch list and tracker data for determining 3D movements by the biomechanical analytics computer system, in accordance with the embodiments disclosed herein. The data store may correlate one or more watch list IDs with one or more tracker IDs. A minimum value, maximum value, and position may also be stored corresponding with the one or more watch list IDs and one or more tracker IDs.

Figure 15:
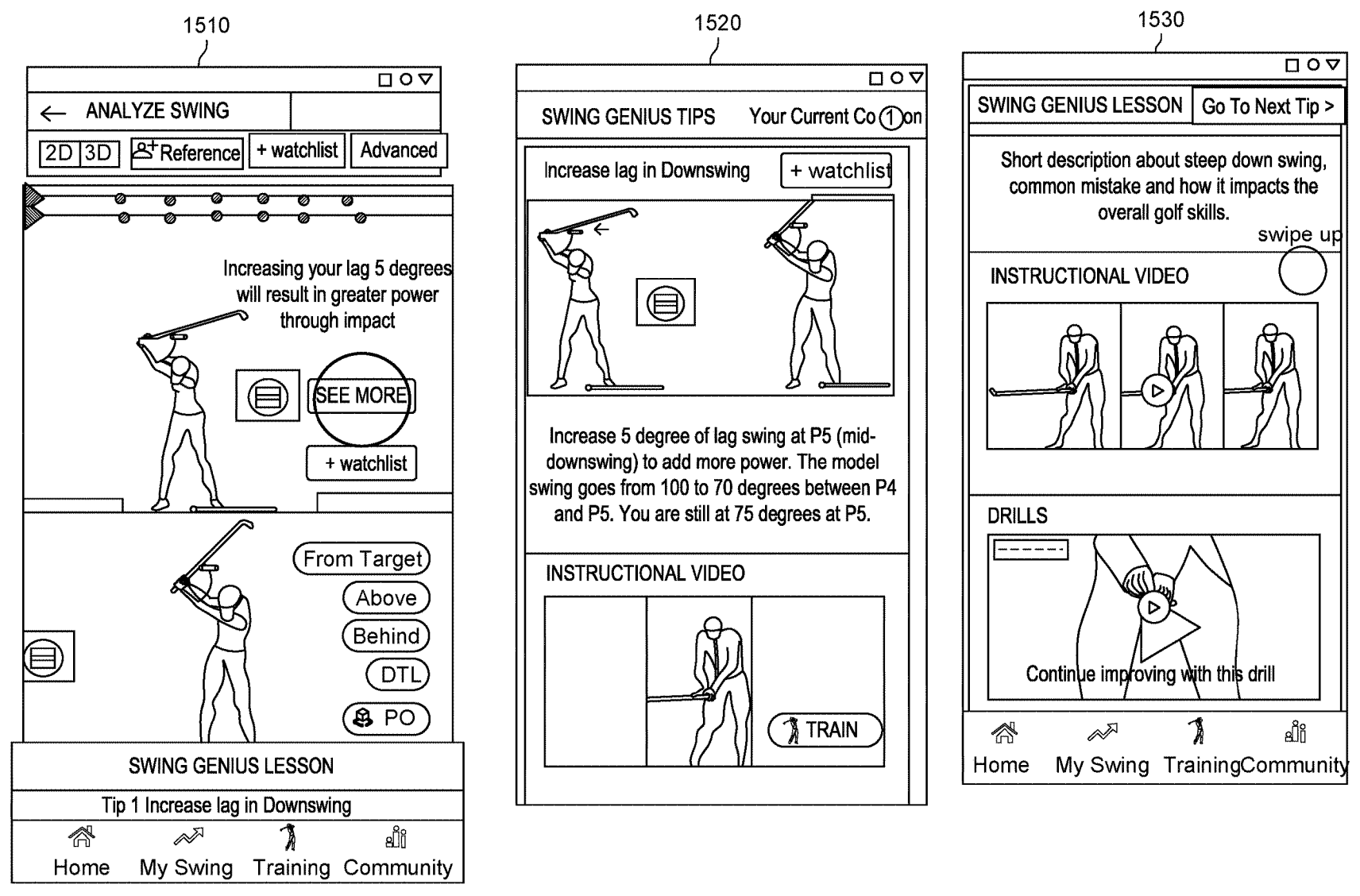

FIG. 15 illustrates a set of user interfaces that provide analysis of an athlete user's movement related to coaching feedback, in accordance with the embodiments disclosed herein. In some examples, the user interfaces may be generated by biomechanical analytics computer system 102 and accessed by one or more user devices 130, as illustrated in FIG. 1. The user interfaces may be generated based on the populated watch lists and motion trackers, as described herein.

At 1510, the user may select from one or more recommended watch list items that are identified by the system. For example, the system may analyze a user's movement (e.g., a golf swing) and provide a set of suggestions. The first suggestion, as an illustrative example, may suggest increasing a lag five-degrees will result in greater power through impact. In response, the user may identify one or more watch list items to meet the increased lag suggestion.

In some examples, the set of suggestions may be based on a new movement performed by the user. For example, user device 130 may record a swing movement of a user and transmit the recording via network 140 to biomechanical analytics computer system 102, as illustrated in FIG. 1. Biomechanical analytics computer system 102 (via Machine learning module 112 and Coaching feedback engine 118) to detect one or more flaws in the user's movement. The flaws may be identified by comparing a single KP or combination of KPs with the movement at a particular position or moment in time that is out of range of the model movement to maximize the outcome (e.g., faster swing speed, fixing a slice or improperly hitting an object, or hitting a trick shot, etc., each of which may correspond with a machine learning model for maximizing that particular outcome).

At 1520, the user may access additional information associated with the set of suggestions. This may include movement suggestions and particular kinematic features to adjust in order to achieve the suggestion by the system.

The user interface may provide one or more tools to a change point of view (POV) of the avatar. This may assist viewing of different views of the avatar in relation to the coaching feedback. The views may include front, side, back views, or a view progression of the swing from any of these angles that is operable through a slider on the user interface. The tools may allow the user to access swing positions other than the beginning or end in order to jump to a particular time or movement.

At 1530, the user may access additional suggestions and progress through tools that describe portions of the user's body. The suggestions may include particular body parts and movements that should change in order to implement the suggestions (e.g., based on the kinematic analysis generated by machine learning module 112 and coaching feedback engine 118 in FIG. 1).

Figure 16:
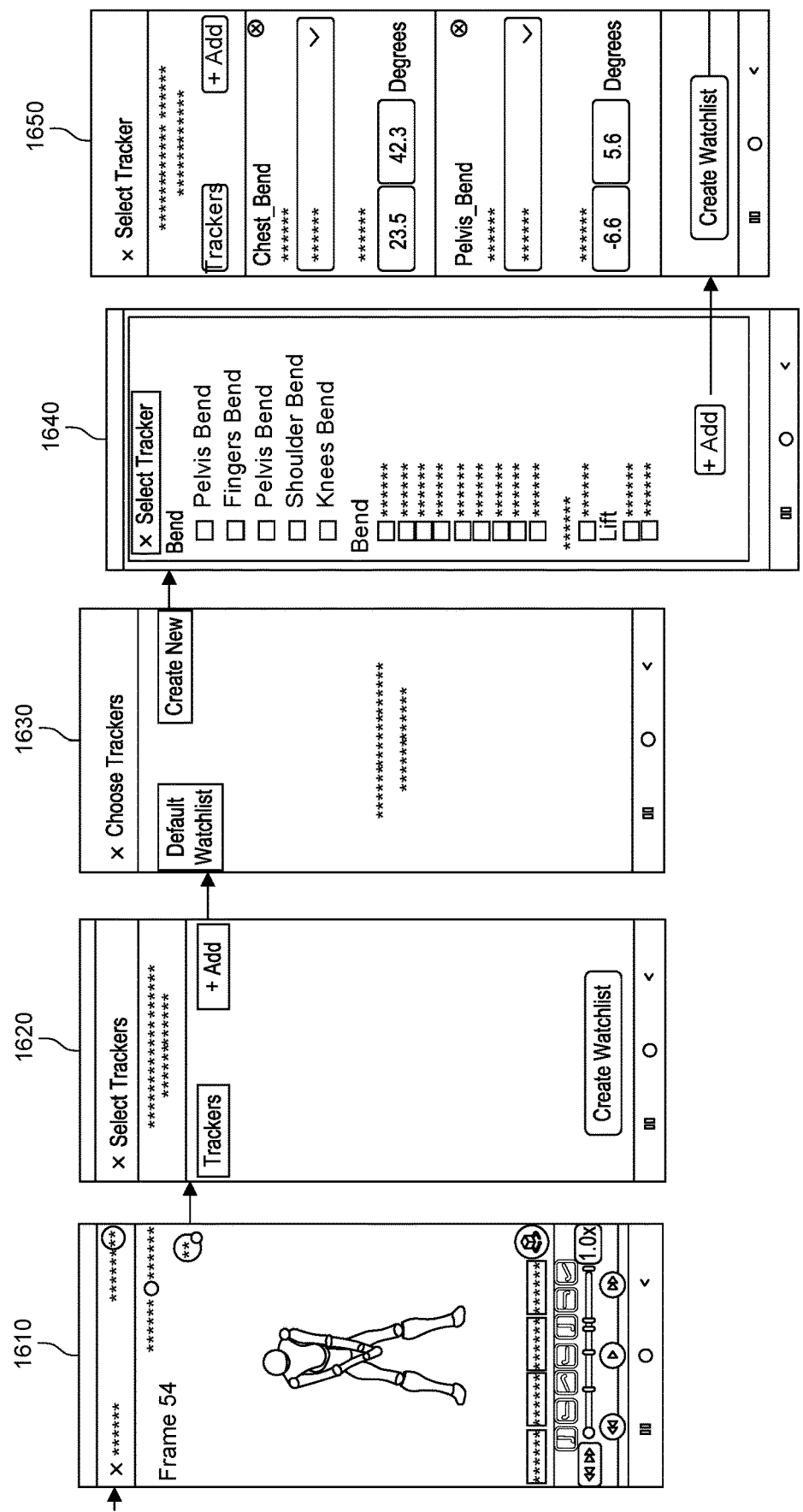
FIG. 16 illustrates a set of user interfaces to select trackers for determining an athlete user's movement, in accordance with the embodiments disclosed herein.

FIG. 16 illustrates a set of user interfaces to select trackers for determining an athlete user's movement, in accordance with the embodiments disclosed herein. In some examples, the user interfaces may be generated by biomechanical analytics computer system 102 and accessed by one or more user devices 130, as illustrated in FIG. 1.

The user may create a custom watch list using a single KP or combination of KPs. In this illustration, at 1610, the user may operate user device 130 to record a new movement, which can be converted to an avatar or other digital representation that identifies KP of the user.

The user may interact with the user interface to select an existing tracker or generate a new tracker at 1620. When a new tracker is generated, the user interface may present a list of swing positions or moments of the swing to select from at 1630. For example, at 1640, the tracker may correspond with a bend movement (e.g., a pelvis bend, chest bend, spine bend, shoulder bend, or other bend), flex movement, or other movement described herein.

At 1650, the user interface may provide a tool to select a goal range, including a minimum or maximum value associated with the outcome. The user may name the watch list item (e.g., "more rotation in the backswing"). Once the custom watch list is generated, coaching feedback engine 118 of FIG. 1 can generate feedback on those items associated with the watch list and trackers and provide them to the user interface. The coaching feedback may be provided via the user interface (e.g., for one or more swings during subsequent practice sessions) when the newly generated tracker is compared with a newly received movement generated by the user and the movement of the user is outside of a range associated with that tracker (e.g., as illustrated with coaching feedback engine 118 of FIG. 1).

The user interface may be updated with corresponding information of items in the watch list. For example, based on the watch list items that are created or selected, the user interface can be updated with recommended practice methods, guides, instructional content, or drill content that targets those watch list items. In some examples, the information may be pre-recorded and matched with the newly received watch list items, and the pre-recorded information may be provided to the user interface of the user device 130 via network 140 of FIG. 1.

Figure 17:
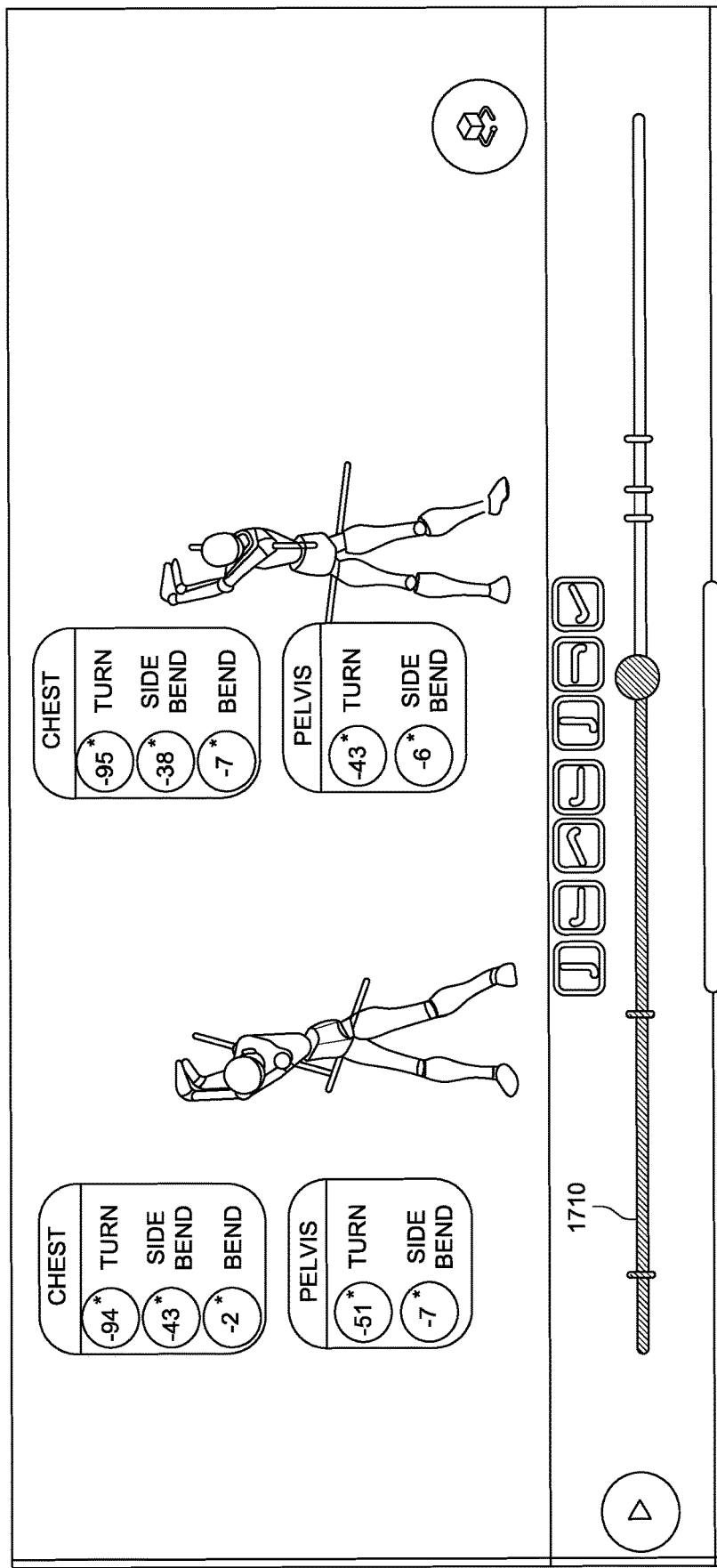
FIG. 17 illustrates a set of user interfaces that show an athlete user's movement as an avatar, in accordance with the embodiments disclosed herein.

FIG. 17 illustrates a set of user interfaces that show an athlete user's movement as an avatar, in accordance with the embodiments disclosed herein. In this illustration, two avatars are provided simultaneously and in parallel on a user interface. A first avatar may perform the movement in coordination with a set of KPs on a watch list or trackers and the second avatar may perform the movement in coordination with the same set of KPs on the watch list or trackers, but in correlation with different values.

For example, the set of KPs on the watch list or trackers for both the first avatar and the second avatar may correspond with a shoulder turn, side bend, shoulder bend, pelvis turn, and pelvis side bend. In the corresponding user interface, the first avatar may perform a chest movement with a 94-degree turn, 43-degree side bend, and 2-degree shoulder bend, and a pelvis movement of 51-degree turn and 7-degree pelvis side bend. The second avatar may perform a chest movement with a 95-degree turn, 38-degree side bend, and 7-degree shoulder bend, and a pelvis movement of 43-degree turn and 6-degree pelvis side bend. The user interface may provide a time-based tool 1710 to progress through the movements showing the corresponding KPs on the watch list or trackers at the particular time or movement.

Figure 18:
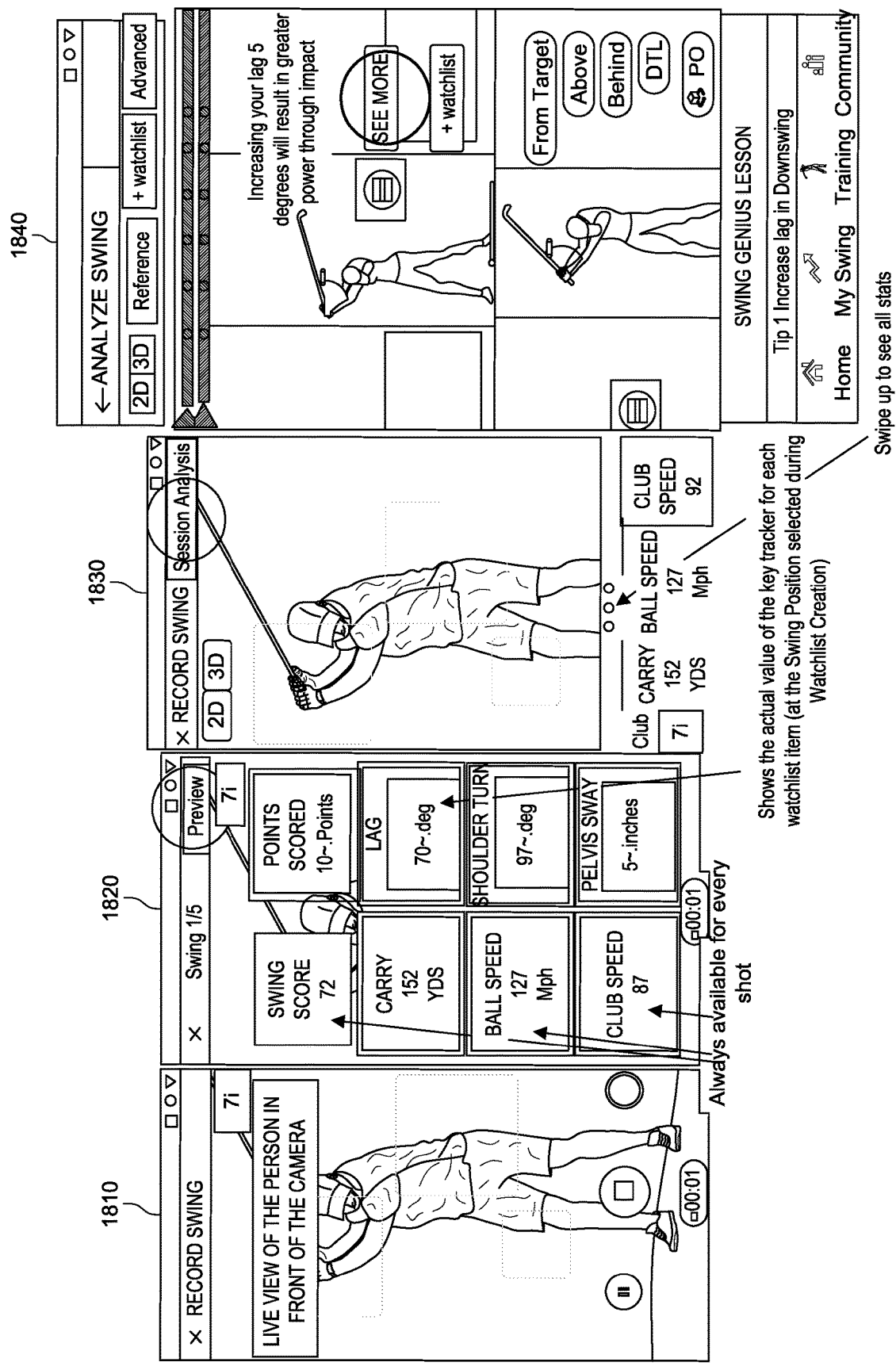
FIG. 18 illustrates a set of user interfaces that show recording options and coaching feedback of an athlete user's movement, in accordance with the embodiments disclosed herein.

FIG. 18 illustrates a set of user interfaces that show recording options and coaching feedback of an athlete user's movement, in accordance with the embodiments disclosed herein. In this illustration, a user may start a recording session by standing in front of the user device 130 and the recording may be transmitted via network 140 to biomechanical analytics computer system 102 illustrated in FIG. 1.

At 1810, the application may autodetect predefined motions recognized by the system. This may include only recording swings but no movements of the user between a start of the swing and the end of the swing.

At 1820, the values corresponding with the swing may be provided to the user interface. For example, the values may include points for each time a user achieves an outcome associated with a movement within a goal range of any watch list items. As an illustrative example, the user may score 10 points and an additional 30 points for achieving an outcome within a predetermined range.

At 1830, the user's movement may be provided as the recording of the user and, at 1840, the user's movement may be provided as the generated avatar. in some examples, coaching feedback may be provided as another user interface screen or overlaid with the recorded movement.

Figure 19:
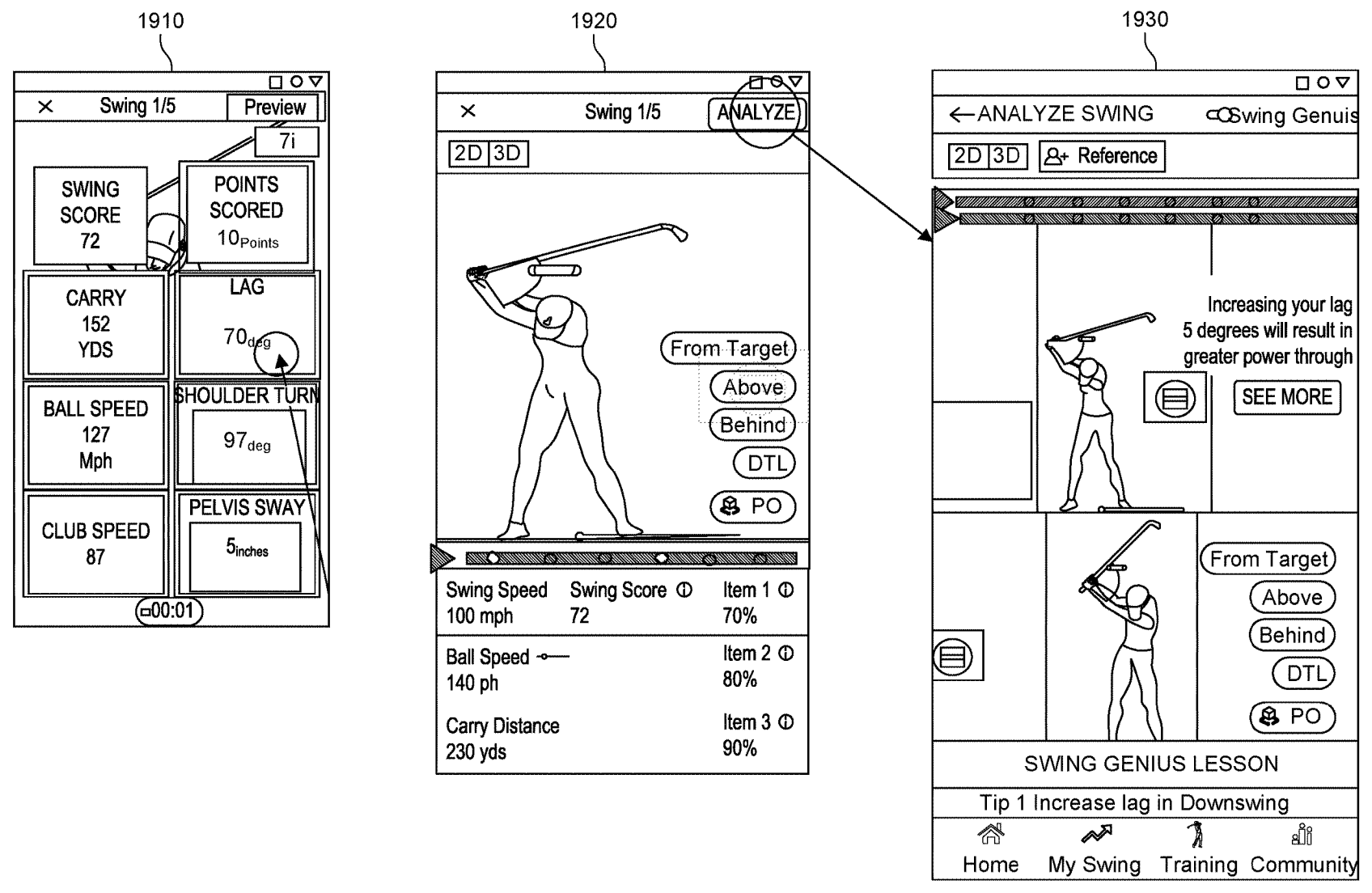

FIG. 19 illustrates a set of user interfaces that show recording options and coaching feedback of an athlete user's movement, in accordance with the embodiments disclosed herein. In this example, the user interface may be updated with watch list items, including values or scores associated with each of the watch list items when the application is first opened or navigated to a particular user interface. At 1910, the watch list items or trackers are provided as an overlay over the recorded movement of the user.

In some examples, each value associated with the tracker may be selectable from this user interface. Once selected, at 1920, the user interface may provide a 3D view of the swing (e.g., as an avatar) with the corresponding KP, tracker, or corresponding body part being color-coded (e.g., in red, yellow, or green) or corresponding with a different visual identifier (e.g., numerical values or adjusted sizes). The adjusted visual identifier may correspond with a comparison between the value of the user's swing with a comparison with the predetermined range for the particular tracker. At 1930, the coaching feedback corresponding with the tracker may also be provided at the user interface.

FIG. 20 illustrates a set of user interfaces that show coaching feedback of an athlete user's movement, in accordance with the embodiments disclosed herein. In this illustration, the replay of the user's movement and/or coaching feedback may be limited to relevant aspects of the tracker. For example, the user interface may provide the avatars movement in slow-motion or on a loop with portions of the avatar highlighted. The system may highlight different portions of the avatar based on the tracker selected by the user in order to change a reference swing or tracker to identify in-depth.

Figure 21:
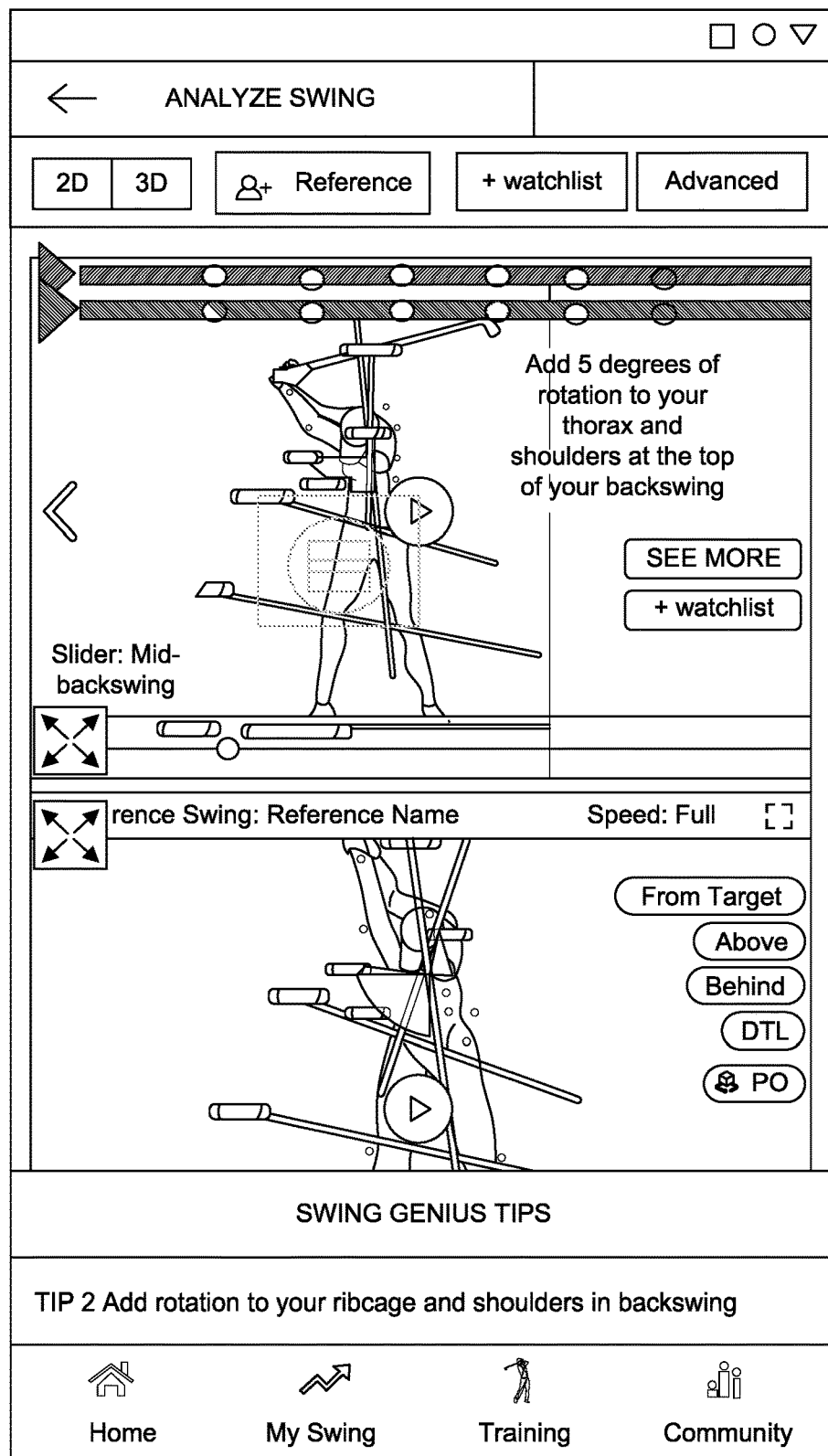
FIG. 21 illustrates a user interface that show coaching feedback of an athlete user's movement, in accordance with the embodiments disclosed herein.

FIG. 21 illustrates a user interface that show coaching feedback of an athlete user's movement, in accordance with the embodiments disclosed herein. In this illustration, the replay of the user's movement may include an overlay to identify an axis or speed as adjusted in accordance with following the coaching feedback. The movement of the user's motion corresponding with the coaching feedback may be playable using a time tool provided by the user interface.

FIG. 22 illustrates images of an athlete user's movement in response to coaching feedback from the system, in accordance with the embodiments disclosed herein. In this illustration, the user may perform actions in a physical environment in response to the first set of coaching feedback. The new movements may be recorded and provided as additional feedback to generate new coaching feedback in response to the new movements, to create a loop of feedback provided by the system and provide directed suggestions to continuously improve the user's movements programmatically.

For illustrative purposes, a physical training recommendation based on a swing assessment is provided. For example, a user's chest and pelvis turn rotational range at the top of the backswing may be low when compared to an average turn rotation. The system may determine that the user's rotational range of motion is limited. The coaching feedback engine may provide a recommendation that the user selects a watch list item to increase backswing rotation. In a list of suggested watch list items, a predetermined watch list item may correspond with a description of "more backswing rotation," which can help the user focus on particular body movements to increase backswing rotation in the physical environment. Once the user selects this watch list item, the system can recommend a practice guide and set of exercises or drills that target the upper and lower body rotation and range of motion. By implementing the practice guide and set of exercises and drills, the user may increase the upper and lower body rotation and range of motion over time.

In some examples, the practice guide and set of exercises and drills may include 15 minutes of mobility exercises (e.g., movements without hitting the golf ball) or other movements, including five repetitions of lunges or rotations, as illustrated in FIG. 22. In other examples, practice guide and set of exercises drills may include more rigorous strength and conditioning exercises with weights or bands that develop key back include muscles and stability of the core. Increasing the strength and mobility of these portions of the body can allow the user to rotate better without losing their posture in the backswing.

With each of these exercises and movements, the system can immediately measure and track the increase in rotational range of motion and the swing to identify whatever weakness or limitation was associated with the user. The system can record the exercises or other movements performed by the user and provide coaching feedback to further improve.

Figure 23:
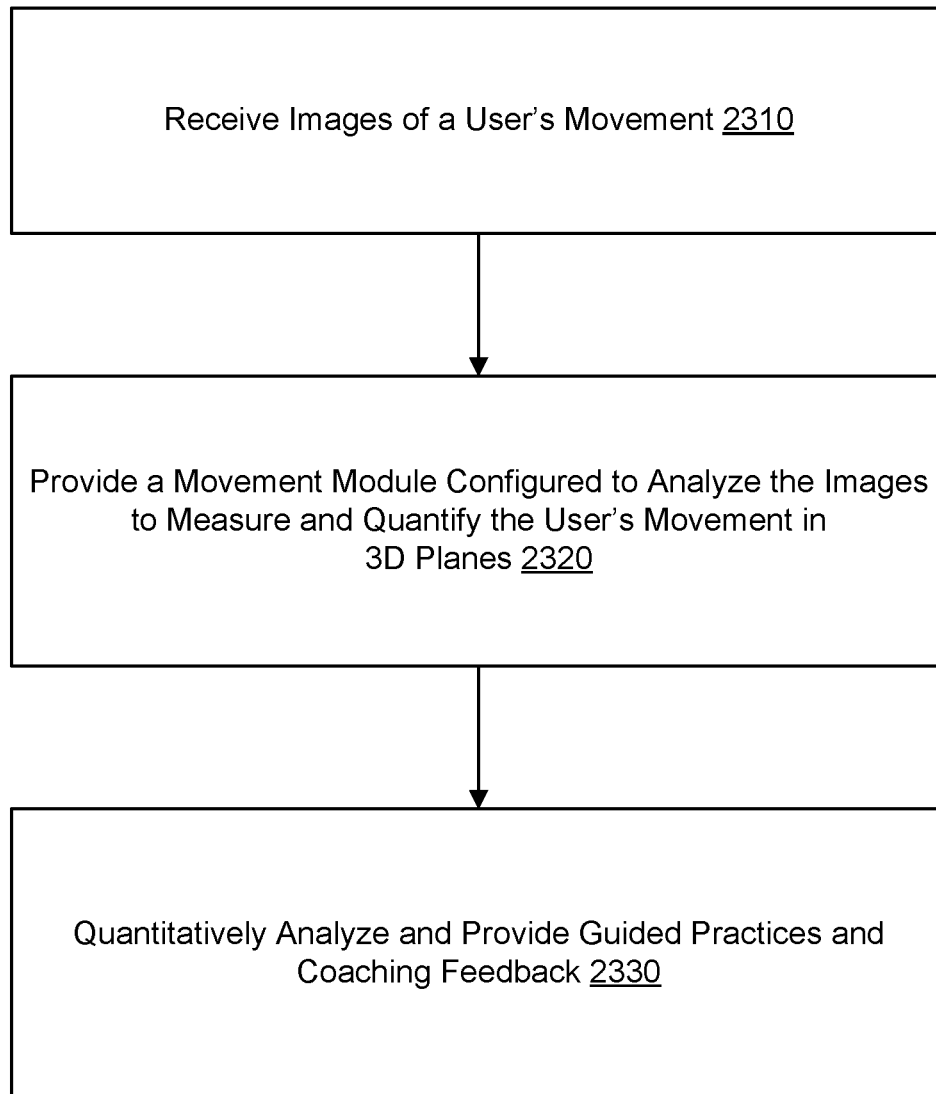
FIG. 23 illustrates a process of applying biomechanical analysis to images of a user's movement during performance of an activity involving movement of a golf club or other object to generate computer-generated 3D avatars, in accordance with the embodiments disclosed herein.

FIG. 23 illustrates a process of applying biomechanical analysis to images of a user's movement during performance of an activity involving movement of a golf club or other object to generate computer-generated 3D avatars, in accordance with the embodiments disclosed herein. The method may be implemented by machine readable instructions executed by processor 104 of biomechanical analytics computer system 102 of FIG. 1.

At block 2310, images of a user's movement may be received. For example, biomechanical analytics computer system 102 may receive, from at least one image capture device like user device(s) 130 or sensor(s) 132 of FIG. 1, images of a user's movement during performance of an activity.

At block 2320, a movement module may be provided. For example, the movement module may be configured to analyze the images to measure and quantify the user's movement in three-dimensional planes including particular movements relating to particular body parts of the user. The particular body parts may correspond with KPs or trackers, as described throughout the disclosure.

At block 2330, the processor may quantitatively analyze a user's movement. For example, the processor of biomechanical analytics computer system 102 may quantitatively analyze a user's movement of predetermined body parts during certain phases of a golf swing or other action and provide guided practices and coaching feedback.

In some examples, the feedback is presented as a 3D representation of the guidance.

In some examples, the feedback comprises a demonstration of the exercises, drills, or audio guidance to be watched/listened to during a user's practice session. In some examples, the demonstration may include a demonstration of a motion or action of the drill and voice navigation describing what is required to correctly perform the drill.

In some examples, the content of the guided practices is determined based on an individual user performance. For example, biomechanical analytics computer system 102 may receive images of the user's practice or actual swings, determine portions of the swing that should be adjusted to improve on distance, accuracy or other performance metric. The adjustments may be based at least in part on tracking biomechanical movements of the user using kinematic parameters.

In some examples, the guided practice information comprises customized drills and exercises that are specifically designed and targeted to the portions of the swing that should be adjusted.

Figure 24:
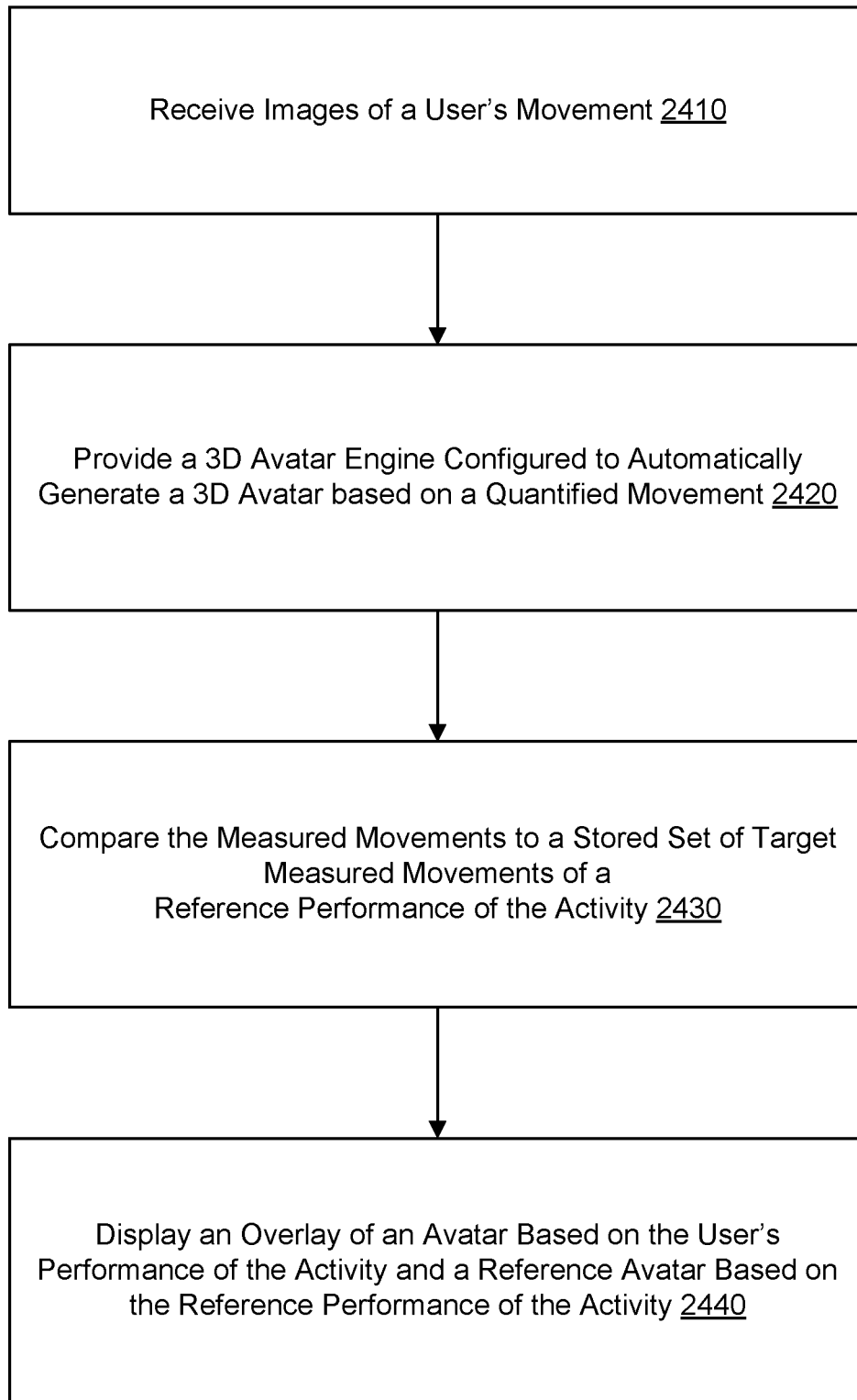
FIG. 24 illustrates a process of applying biomechanical analysis to images of a user's movement during performance of an activity to generate computer-generated 3D avatars, in accordance with the embodiments disclosed herein.

FIG. 24 illustrates a process of applying biomechanical analysis to images of a user's movement during performance of an activity to generate computer-generated 3D avatars, in accordance with the embodiments disclosed herein. The method may be implemented by machine readable instructions executed by processor 104 of biomechanical analytics computer system 102 of FIG. 1.

At block 2410, images of a user's movement may be received. For example, biomechanical analytics computer system 102 may receive, from at least one image capture device including user device(s) 130 or sensor(s) 132 of FIG. 1, images of a user's movement during performance of an activity provide a movement module configured to analyze the images to measure and quantify the user's movement in three-dimensional planes.

At block 2420, a 3D avatar engine may be provided. The 3D avatar engine may be configured to automatically generate a 3D avatar based on the quantified movement.

In some examples, a display generator may be provided. The display generator may be configured to display and animate the 3D avatar to cause movement of the 3D avatar along three-dimensional planes based on the measure, quantified movement from the images.

At block 2430, the processor is further configured to compare the measured movements in a user's performance of an activity to a stored set of target measured movements of a reference performance of the activity.

Figure 25:
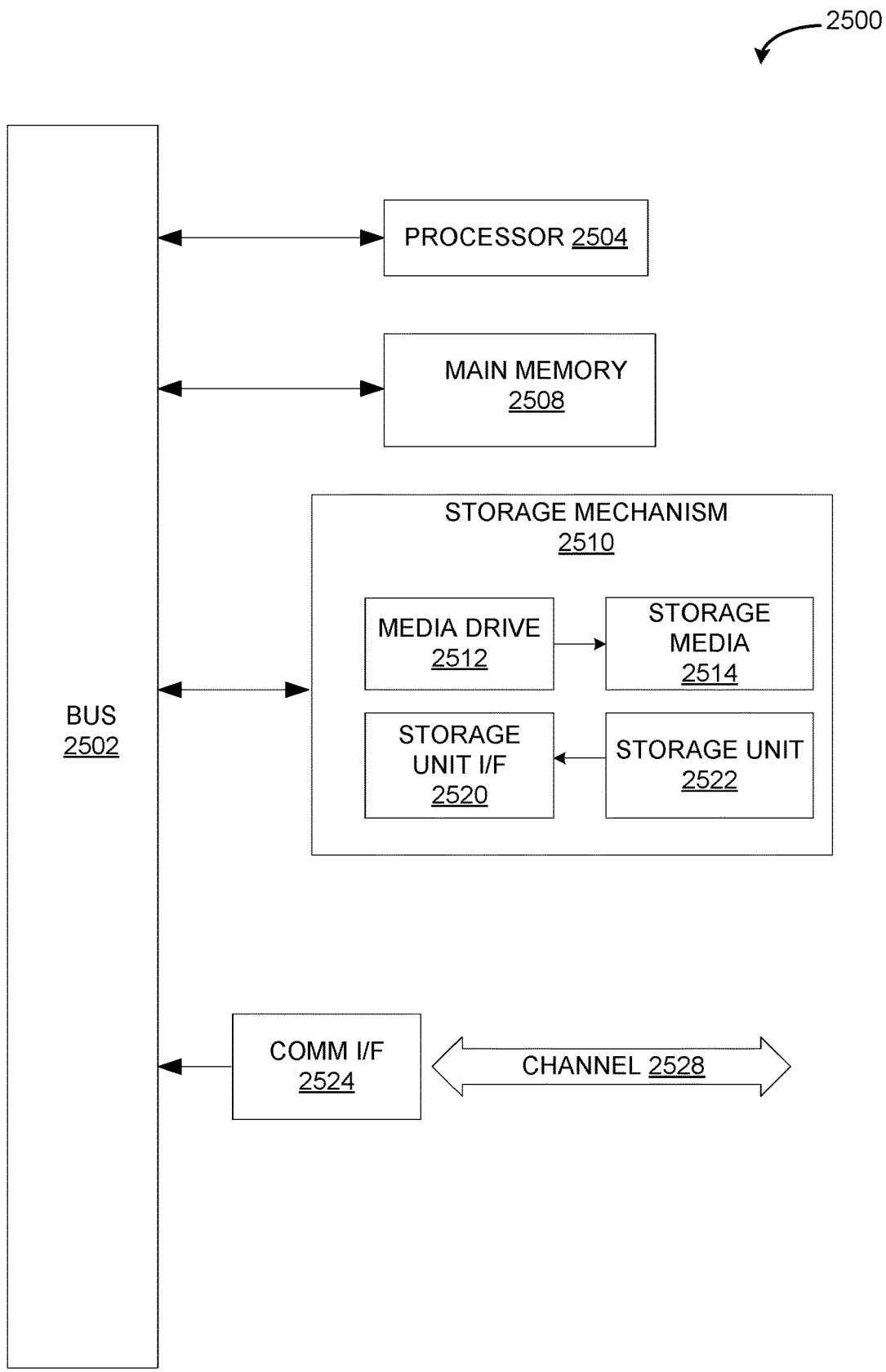
FIG. 25 is an example of a computing system that may be used in implementing various features of embodiments of the disclosed technology.

At block 2440, the 3D avatar engine is further configured to display an overlay of an avatar based on the user's performance of the activity and a reference avatar based on the reference performance of the activity.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 25. Various embodiments are described in terms of this example logical circuit 2500. After reading this description, it will become apparent to a person skilled in the relevant art how to implement the technology using other logical circuits or architectures.

Referring now to FIG. 25, computing system 2500 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 2500 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 2500 might include, for example, one or more processors, controllers, control engines, or other processing devices, such as a processor 2504. Processor 2504 might be implemented using a general-purpose or special-purpose processing engine such as, for example, a microprocessor, controller, or other control logic. In the illustrated example, processor 2504 is connected to a bus 2502, although any communication medium can be used to facilitate interaction with other components of logical circuit 2500 or to communicate externally.

Computing system 2500 might also include one or more memory engines, simply referred to herein as main memory 2508. For example, preferably random-access memory (RAM) or other dynamic memory, might be used for storing information and instructions to be executed by processor 2504. Main memory 2508 might also be used for storing temporary variables or other intermediate information during execution of instructions to be executed by processor 2504. Logical circuit 2500 might likewise include a read only memory ("ROM") or other static storage device coupled to bus 2502 for storing static information and instructions for processor 2504.

The computing system 2500 might also include one or more various forms of information storage mechanism 2510, which might include, for example, a media drive 2512 and a storage unit interface 2520. The media drive 2512 might include a drive or other mechanism to support fixed or removable storage media 2514. For example, a hard disk drive, a floppy disk drive, a magnetic tape drive, an optical disk drive, a CD or DVD drive (R or RW), or other removable or fixed media drive might be provided. Accordingly, storage media 2514 might include, for example, a hard disk, a floppy disk, magnetic tape, cartridge, optical disk, a CD or DVD, or other fixed or removable medium that is read by, written to, or accessed by media drive 2512. As these examples illustrate, the storage media 2514 can include a computer usable storage medium having stored therein computer software or data.

In alternative embodiments, information storage mechanism 2540 might include other similar instrumentalities for allowing computer programs or other instructions or data to be loaded into logical circuit 2500. Such instrumentalities might include, for example, a fixed or removable storage unit 2522 and an interface 2520. Examples of such storage units 2522 and interfaces 2520 can include a program cartridge and cartridge interface, a removable memory (for example, a flash memory or other removable memory engine) and memory slot, a PCMCIA slot and card, and other fixed or removable storage units 2522 and interfaces 2520 that allow software and data to be transferred from the storage unit 2522 to logical circuit 2500.

Logical circuit 2500 might also include a communications interface 2524. Communications interface 2524 might be used to allow software and data to be transferred between logical circuit 2500 and external devices. Examples of communications interface 2524 might include a modem or soft modem, a network interface (such as an Ethernet, network interface card, WiMedia, IEEE 802.XX or other interface), a communications port (such as for example, a USB port, IR port, RS232 port, Bluetooth® interface, or other port), or other communications interface. Software and data transferred via communications interface 2524 might typically be carried on signals, which can be electronic, electromagnetic (which includes optical) or other signals capable of being exchanged by a given communications interface 2524. These signals might be provided to communications interface 2524 via a channel 2528. This channel 2528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 2508, storage unit 2520, media 2514, and channel 2528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 2500 to perform features or functions of the disclosed technology as discussed herein.

Although FIG. 25 depicts a computer network, it is understood that the disclosure is not limited to operation with a computer network, but rather, the disclosure may be practiced in any suitable electronic device. Accordingly, the computer network depicted in FIG. 25 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system configured for applying biomechanical analysis to a sequence of two-dimensional (2D) images of a user's movement during performance of a sport activity to quantitatively analyze the user's movement of predetermined body parts during certain phases of the sport activity, generate a computer-generated 3D avatar of the user's performance, including movement of the predetermined body parts, the system comprising:
a data storage device for storing user-definable watchlists comprising a list of measurable attributes of the performance to be monitored during performance of the sport activity and motion trackers comprising a user-definable sequence of measurements to be taken during the performance, including specific kinematic parameters and/or sequences of motion;
one or more hardware processors configured by machine-readable instructions to:
receive, from an image capture device, the sequence of 2D images of the user's movement during the performance of the sport activity;
implement a movement module configured to quantitatively analyze the sequence of 2D images to measure and quantify the user's movement in 2D space based on the measurable attributes in a selected watchlist, including the movement of predetermined body parts specified in the selected watchlist and measurement of the kinematic parameters and/or sequences of motions corresponding to one or more selected motion trackers;
provide the sequence of 2D images, including individual frames of the sequence, to a machine learning (ML) module, where individual frames contain 2D coordinates for individual body parts of one or more limbs that are moving during the performance of the sport activity;
provide the frames to a 3D ML model;
generate, based on the 3D ML model, a set of frames with 3D coordinates;
implement an inference process on the set of frames with the 3D coordinates for generating the computer-generated 3D avatar of the user's performance based on the measured, quantified movement;
generate the computer-generated 3D avatar of the user's performance based on the measured, quantified movement and animate the computer-generated 3D avatar to cause movement of the computer-generated 3D avatar in three-dimensional space based on the measured, quantified movement from the 2D images, wherein the animation of the computer-generated 3D avatar comprises 3D pose estimation that corresponds with a model-based generative method that treats the predetermined body parts identified in the selected watchlist as an articulated structure with a model that includes the predetermined body parts and the spatial relationship between adjacent parts; and
display the computer-generated 3D avatar on a user interface with display options for enabling the user to view the computer-generated 3D avatar from any angle during certain performance of the sport activity.

2. The system of claim 1, wherein the one or more hardware processors are configured by machine-readable instructions to:
generate a computer-generated 3D reference avatar;
display the computer-generated 3D reference avatar on a user interface simultaneously and in parallel with the computer-generated 3D avatar.

3. The system of claim 1, wherein the one or more hardware processors are configured by machine-readable instructions to generate the computer-generated 3D avatar based on a first set of values associated with the kinematic parameters and generate the computer-generated 3D reference avatar based on a second set of values associated with the same kinematic parameters.

4. The system of claim 1, wherein the one or more hardware processors are configured by machine-readable instructions to display recorded motion data from a reference video of the user's movement during performance of the sport activity.

5. The system of claim 4, wherein the one or more hardware processors are configured by machine-readable instructions to generate a time-synchronized display of the computer-generated 3D avatar and a video recording of a past performance of the user to compare the performance with the past performance.

6. The system of claim 4, wherein the one or more hardware processors are configured by machine-readable instructions to derive a sequence of kinematic parameters from the reference video.

7. The system of claim 1, wherein the one or more hardware processors are configured by machine-readable instructions to display on the user interface a time-based tool to progress through movements and display the corresponding kinematic parameters of the watch list or the motion trackers at the corresponding time of the movement.

8. The system of claim 1, wherein the one or more hardware processors are configured by machine-readable instructions to provide guided practice with feedback for the user including display of images or video of the user performing the guided practice.

9. The system of claim 1, wherein the one or more hardware processors are configured by machine-readable instructions to provide guided practice for the user including display of images or video that analyze the user performance in relation to one or more identified portions of the performance to improve.

10. The system of claim 1, wherein the one or more hardware processors are configured by machine-readable instructions to provide guided practice feedback for the user including display of a comparison of the user's desired outcome with an actual outcome.

11. The system of claim 1, wherein the one or more hardware processors are configured by machine-readable instructions to provide guided practice feedback for the user including display of a comparison of the user's desired outcome with an actual outcome and visually identify differences between the two.

12. The system of claim 1, further comprising a data processing module configured to determine outcome data of the performance of the sport activity and the one or more hardware processors are configured by machine-readable instructions to correlate the user's performance of the sport activity with the outcome it produces.

13. The system of claim 1, further comprising a human movement module configured to access images or video stored in an analytics data store and attempt to identify a human movement that is closest to the user's movement performed in the images or video.

14. The system of claim 1, further comprising a human movement module configured to access images or video stored in an analytics data store and attempt to identify a human movement that matches the user's movement performed in the images or video.

15. The system of claim 1, further comprising a human movement module configured to access images or video stored in an analytics data store and identify a human movement that has a likelihood of matching the user's movement performed in the images or video based on a percentage match or percentage match above a threshold value.

16. The system of claim 1, further comprising a 3D avatar engine configured to generate the computer-generated 3D avatar incorporating kinematic parameters and sequences to cause the computer-generated 3D avatar to biomechanically represent the sport activity.

17. The system of claim 1, further comprising a rendering manager configured to generate a time-synchronized computer-generated 3D avatar rendering with additional data, the additional data comprising a video recording of past performance by the user to compare current performance with past performance, a video recording of a reference performance, or automatically detected differences between two performances.

18. The system of claim 1, wherein the one or more hardware processors are further configured by the machine-readable instructions to:
execute a coaching feedback engine to determine portions of the sport activity to be adjusted based at least in part on tracking kinematic parameters of user's movements of predetermined body parts during certain phases of the sport activity of the user and provide guided practices and/or coaching feedback to the user for particular body parts and movements to implement suggestions based on the kinematic parameters.

19. The system of claim 18, wherein feedback is presented as a 3D representation of the guided practices and coaching feedback, wherein the guided practices comprises customized drills and exercises that are specifically designed and targeted to the portions of the sport activity that are determined to need adjustment.

20. The system of claim 18, wherein guided practices and coaching feedback comprises a demonstration of exercises, drills, or audio guidance to be watched/listened to during a user's practice session, including a demonstration of a motion or action of a drill and voice navigation describing what is required to correctly perform the drill.

21. The system of claim 18, wherein content of the guided practices is determined based on an individual user performance, wherein the system receives images of the user's practice or actual movement and determines portions of the movement that should be adjusted to improve on distance, accuracy or other performance metric, based at least in part on tracking biomechanical movements of the user using kinematic parameters.

22. The system of claim 18, wherein the guided practices and coaching feedback comprise a demonstration of exercises, drills, or audio guidance.

23. The system of claim 18, wherein the guided practices and coaching feedback comprise one or more images of the user's movement based on tracking biomechanical movements of the user.

24. The system of claim 18, wherein the guided practices and coaching feedback provide feedback to optimize portions of the sport activity or accuracy of a resulting ball placement.

25. The system of claim 18, wherein the guided practices and coaching feedback are displayed through movements of the computer-generated 3D avatar via a user interface, wherein the one or more hardware processors are further configured to cause the user interface to display recording options and coaching feedback of the user's movement and to update the user interface with watchlist items, including values associated with a set of watchlist items as an overlay over recorded movement of the user, wherein individual values associated with a motion tracker may be selectable from the user interface to cause display of a 3D avatar view of the sport activity with corresponding kinematic parameters, a motion tracker, or corresponding body part.

26. The system of claim 25, wherein the one or more hardware processors are configured to detect multiple joints through a conversion of a 2D pose estimation into a 3D space using a frame-by-frame recognition of the sequence of 2D images and the set of frames outputted and inferred by the machine learning model, and wherein the multiple joints are connected to assess kinematic parameters and sequences relative to a specific domain.

27. The system of claim 1, wherein the one or more hardware processors is further configured to determine, from the sequence of 2D images, portions of the user's movement during the sport activity to be adjusted based at least in part on tracking biomechanical movements, including movement of specific body parts during the sport activity based on the selected watchlist and measurement of specific kinematic parameters and/or sequences of movements based on one or more selected motion trackers and comparing the measured movements in the user's performance of the sport activity to a stored set of target measured movements of a reference performance of the sport activity, wherein a guided practice comprises customized drills and exercises that are specifically designed and targeted to portions of the sport activity which are determined to need adjustment, based on the kinematic parameters of components in the selected watchlist at predetermined positions in the sport activity.

28. The system of claim 1, wherein the one or more hardware processors are further configured by the machine-readable instructions to:
generate a watchlist of measurable attributes relating to the predetermined body parts, wherein the watchlist is used in quantitatively analyzing the performance of the sport activity.

29. The system of claim 1, wherein the one or more hardware processors are further configured by the machine-readable instructions to:
generate a motion tracker corresponding with certain phases of the user's movement or other action that is correlated to the user's movement in the 2D space including particular movements relating to particular body parts.

30. The system of claim 29, wherein the motion tracker comprises specific kinematic parameters or sequences of motion relating to the user's movement with respect to time.

31. The system of claim 29, wherein the motion tracker comprises specific kinematic parameters or sequences of motion relating to a first order, second order, or derivative of the user's movement with respect to time.

32. The system of claim 1, wherein the one or more hardware processors are configured to perform a quantitative analysis of the user's movement of predetermined body parts using a neural network or machine learning model.

33. The system of claim 32, wherein the neural network or machine learning model is trained using coach feedback that defines a correct performance of the sport activity.

34. The system of claim 32, wherein the neural network or machine learning model is trained to determine a standard pre-shot routine over time.

35. The system of claim 32, wherein the neural network or machine learning model is trained to learn dependencies between limbs and joints using movements captured from devices and sensors associated with one or more users.

36. The system of claim 1, wherein the one or more hardware processors are further configured by the machine-readable instructions to:
simultaneously display a first avatar based on the performance of the sport activity and a reference avatar based on a reference performance of the sport activity, wherein the first avatar and the reference avatar are configured to provide guided practices and coaching feedback.

37. The system of claim 1, wherein the one or more hardware processors are further configured by the machine-readable instructions to:
assess a user's change in performance over time to gauge improvement based on different training regimens or techniques, compare measurements of the motion trackers against experts or other users and rank the user's performance against such experts or other users based on closest measurements of kinematic parameters and sequences of motions against a target measurement or outcome.

38. The system of claim 1, wherein the one or more hardware processors are further configured by the machine-readable instructions to:
adjust guided practices and drills based on physical limitations of the user that can affect the sport activity where the guided practices are provided as feedback for the user which may be filtered or removed based on the physical limitations.

39. The system of claim 1, wherein the one or more hardware processors are further configured by the machine-readable instructions to:
tailor component structures of 3D avatars and points tracked based on golf domain specific criteria, including body points that correspond with pose, movement, and/or alignment during the sport activity and a weighting of the kinematic parameters and sequences of motions based on objectives relevant for fault-correction within a golf domain.

40. The system of claim 1, further comprising a coaching feedback engine configured to generate step-by-step images of movements illustrated via a 3D avatar moving through a kinematic motion, wherein the avatar movements correspond with proper movements that are generated by the coaching feedback engine and wherein the avatar movements and a set of suggestions are stored in an avatar data store and the avatar data store comprises 3D avatars that are generated by the coaching feedback engine and one or more user generated suggestions of how to achieve an illustrated movement performed by the 3D avatar.

41. The system of claim 40, wherein the coaching feedback engine is further configured to detect one or more flaws in the user's movement by comparing attributes of a single kinematic parameter or a combination of kinematic parameters of a movement with a stored movement at a particular position in the sport activity, and when the movement is determined to be out of a range of the stored movement, the coaching feedback engine is configured to identify the movement as being out of range.

42. The system of claim 1, wherein values associated with a motion tracker are selectable from the user interface and the user interface is further configured to generate the computer-generated 3D avatar of a golf swing with a corresponding kinematic parameter, the motion tracker, and/or corresponding body part and a comparison between a value of the user's movement and a predetermined range of values for the motion tracker.

43. The system of claim 1, wherein the one or more hardware processors are further configured by the machine-readable instructions to:
 display a replay of the user's movement limited to relevant aspects of a selected motion tracker and limit coaching feedback to feedback relevant to a selected motion tracker.

44. The system of claim 1, wherein the one or more hardware processors are further configured by the machine-readable instructions to:
 provide a physical training recommendation based on movement assessments based on one or more specific body parts and a selected motion of those one or more parts at a portion of the sport activity when compared to a stored value or range for the one or more specific body parts and the selected motion of those one or more parts, further comprising a coaching feedback engine configured to provide a recommendation based on a user-selected watchlist item related to the selected motion and, in response to selection of the user-selected watchlist item, generate a recommended practice guide and a set of exercises or drills that target the selected motion.

\* \* \* \* \*